(12) United States Patent
Topliss et al.

(10) Patent No.: US 9,137,429 B2
(45) Date of Patent: Sep. 15, 2015

(54) CAMERA APPARATUS

(75) Inventors: Richard Topliss, Cambridge (GB); Andrew Benjamin David Brown, Cambridge (GB)

(73) Assignee: CAMBRIDGE MECHATRONICS LIMITED, Cambridge, Cambridgeshire (GB)

( * ) Notice: Subject to any disclaimer, the term of this patent is extended or adjusted under 35 U.S.C. 154(b) by 180 days.

(21) Appl. No.: 13/814,766

(22) PCT Filed: Aug. 3, 2011

(86) PCT No.: PCT/GB2011/001164
§ 371 (c)(1),
(2), (4) Date: May 14, 2013

(87) PCT Pub. No.: WO2012/020212
PCT Pub. Date: Feb. 16, 2012

(65) Prior Publication Data
US 2013/0222685 A1 Aug. 29, 2013

(30) Foreign Application Priority Data

| Aug. 9, 2010 | (GB) | ................... | 1013296.7 |
| Nov. 17, 2010 | (GB) | ................... | 1019401.7 |
| Dec. 17, 2010 | (GB) | ................... | 1021415.3 |
| Apr. 28, 2011 | (GB) | ................... | 1107276.6 |

(51) Int. Cl.
*H04N 5/225* (2006.01)
*G02B 27/64* (2006.01)
(Continued)

(52) U.S. Cl.
CPC ............ *H04N 5/2251* (2013.01); *G02B 27/646* (2013.01); *G03B 5/00* (2013.01);
(Continued)

(58) Field of Classification Search
CPC ............................. H04N 19/112; G06F 17/145
USPC .......................... 348/222.1, 239, 281; 382/240
See application file for complete search history.

(56) References Cited

U.S. PATENT DOCUMENTS

| 4,932,210 A | 6/1990 | Julien et al. |
| 6,516,146 B1 | 2/2003 | Kosaka |

(Continued)

FOREIGN PATENT DOCUMENTS

| EP | 1304872 A1 | 4/2003 |
| EP | 1626177 A1 | 2/2006 |

(Continued)

*Primary Examiner* — Joel Fosselman
(74) *Attorney, Agent, or Firm* — Harness, Dickey & Pierce, P.L.C.

(57) ABSTRACT

In a camera apparatus, two SMA actuator subsystems each comprise two SMA wires connected between a camera unit and a support structure, hooked over a pivot element defining pivot axes that lie in a common plane along the optical axis. Differential contraction of the SMA wires drives rotation. The SMA actuator subsystems are opposed, but the SMA wires of each subsystem are fixed respectively to the camera unit and the support structure, reducing the height. A nonconductive substrate supporting conductive tracks electrically connected to the SMA actuator system is configured as a flexure arrangement between the camera unit and the support structure. The flexure arrangement is connected to the camera unit at a position in the common plane reducing lateral resistance to tilt. Use of an intermediate connector element allows the circuit board to be arranged in front of the intermediate connector inside the height of the lens system.

26 Claims, 10 Drawing Sheets

(51) Int. Cl.
*G03B 5/00* (2006.01)
*H04N 1/00* (2006.01)
*H04N 5/232* (2006.01)

(52) U.S. Cl.
CPC ........ *H04N 1/00307* (2013.01); *H04N 5/2257* (2013.01); *H04N 5/23287* (2013.01); *G03B 2205/0023* (2013.01); *G03B 2205/0076* (2013.01)

(56) References Cited

U.S. PATENT DOCUMENTS

| | | | |
|---|---|---|---|
| 6,574,958 | B1 | 6/2003 | MacGregor |
| 2001/0025477 | A1 | 10/2001 | Hara et al. |
| 2003/0079472 | A1 | 5/2003 | Hara et al. |
| 2006/0150627 | A1 | 7/2006 | Oohara |
| 2006/0272328 | A1 | 12/2006 | Hara et al. |
| 2007/0109412 | A1 | 5/2007 | Hara |
| 2007/0279497 | A1 | 12/2007 | Wada et al. |
| 2008/0085108 | A1 | 4/2008 | Sekino et al. |
| 2008/0198249 | A1 | 8/2008 | Tanimura et al. |
| 2008/0278030 | A1 | 11/2008 | Hara et al. |
| 2008/0278590 | A1 | 11/2008 | Tanimura et al. |
| 2009/0052037 | A1 | 2/2009 | Wernersson |
| 2010/0098394 | A1 | 4/2010 | Ishihara et al. |
| 2011/0249131 | A1* | 10/2011 | Topliss et al. ............. 348/208.7 |

FOREIGN PATENT DOCUMENTS

| | | |
|---|---|---|
| GB | 2434214 A | 7/2007 |
| JP | 2002 130114 A | 5/2002 |
| JP | 2006154345 A | 6/2006 |
| JP | 2006178303 A | 7/2006 |
| WO | WO-03048831 A2 | 6/2003 |
| WO | WO-2006059098 A1 | 6/2006 |
| WO | WO-2007/113478 A1 | 10/2007 |
| WO | WO-2008/099156 A2 | 8/2008 |
| WO | WO-2008-129291 A2 | 10/2008 |
| WO | WO-2009/027775 A1 | 3/2009 |
| WO | WO-2009056822 A2 | 5/2009 |
| WO | WO-2010/029316 A2 | 3/2010 |
| WO | WO-2010/089526 A2 | 8/2010 |
| WO | WO-2010/089529 A1 | 8/2010 |

* cited by examiner

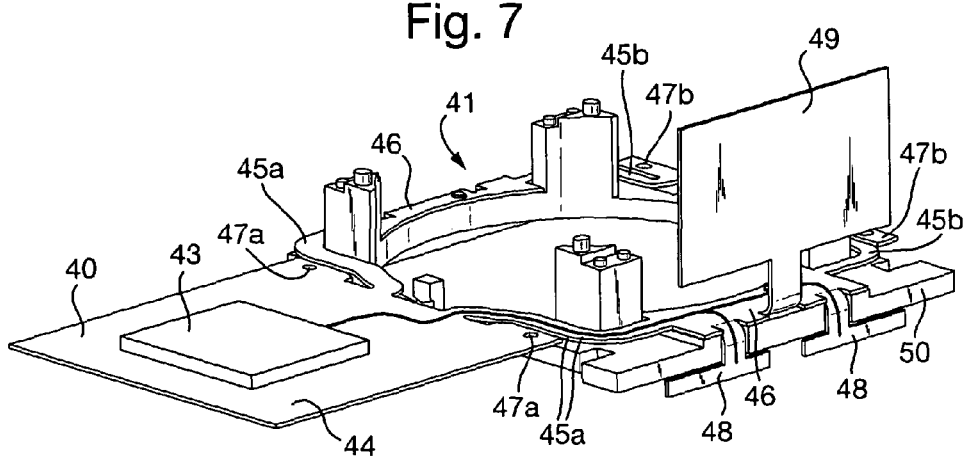
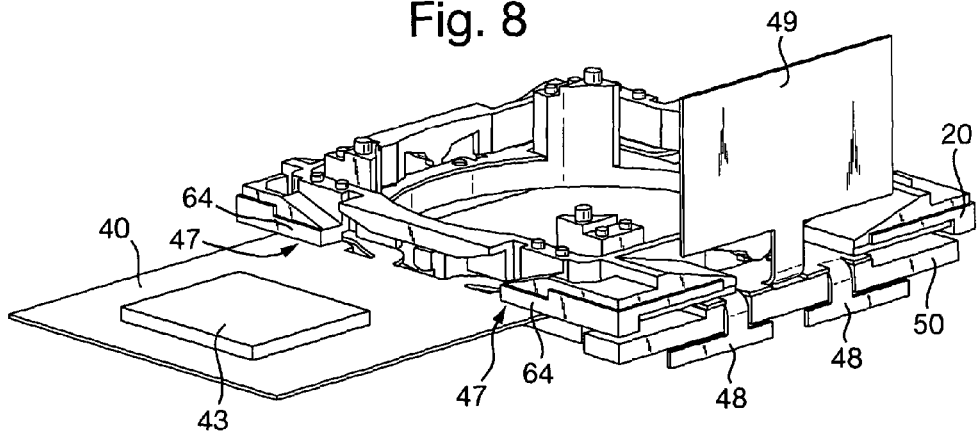

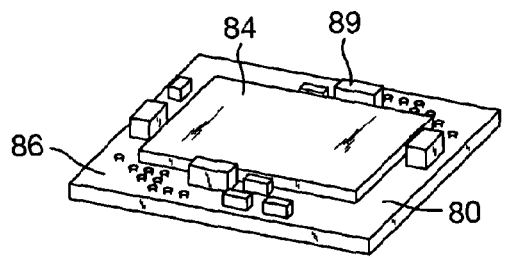
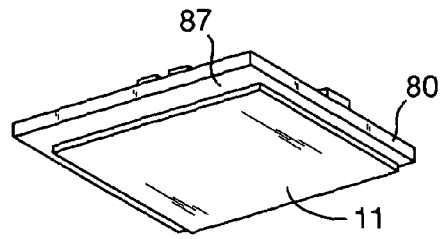
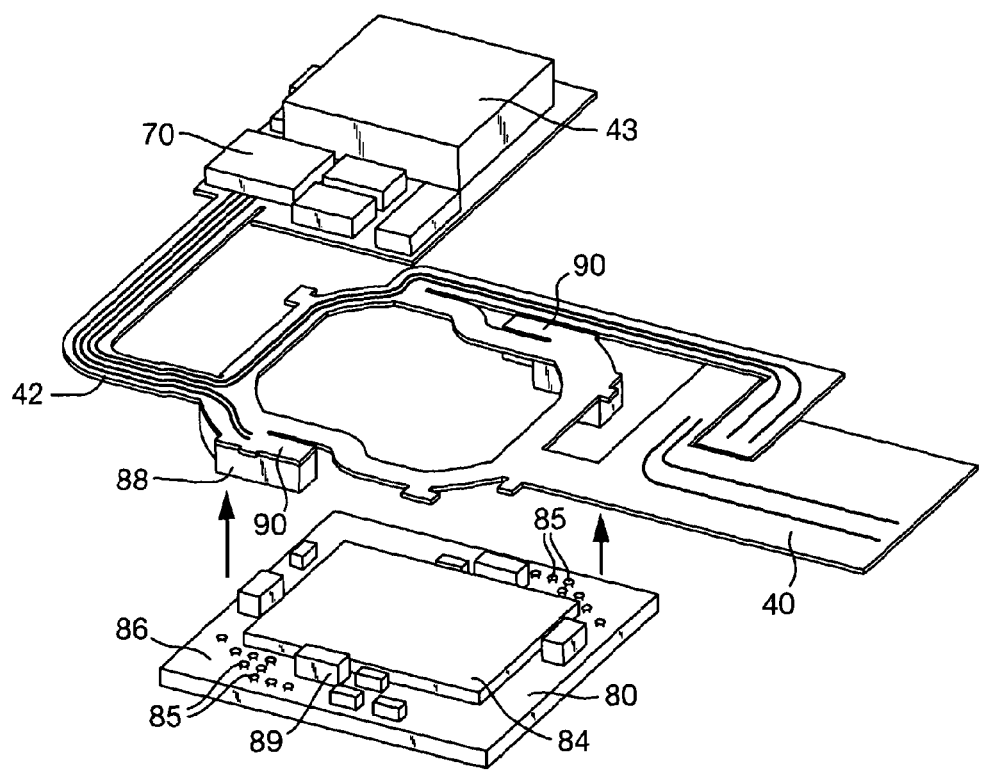

CAMERA APPARATUS

CROSS-REFERENCE TO RELATED APPLICATIONS

This application is a 371 U.S. National Stage of International Application No. PCT/GB2011/001164, filed on Aug. 3, 2011, which claims priority to British Patent Application No. 1013296.7, filed on Aug. 9, 2010, British Patent Application No. 1019401.7, filed on Nov. 17, 2010, British Patent Application No. 1021415.3, filed on Dec. 17, 2010, and British Patent Application No. 1107276.6 filed on Apr. 28, 2011. The contents of the above applications are herein incorporated by reference in their entirety.

The first to third aspects of the present invention relate to optical image stabilisation (OIS) of a camera apparatus comprising an image sensor and a lens system for focussing an image on the image sensor. The fourth aspect of the present invention relates more generally to a camera apparatus comprising an image sensor and a lens system for focussing an image on the image sensor.

Camera apparatuses are becoming very common in a wide range of portable equipment, for example mobile telephones and smartphones.

The purpose of OIS is to compensate for camera shake, that is vibration of the camera apparatus typically caused by user hand movement, that degrades the quality of the image captured by the image sensor. OIS typically involves detection of the vibration by a vibration sensor such as a gyroscope sensor, and control on the basis of the detected vibration of an actuator system that adjusts the camera apparatus to compensate the captured image for the vibration.

Several techniques for adjusting the camera apparatus are known. One technique typically employed in digital stills cameras is to keep the position of the camera unit as a whole fixed (including the image sensor and most of the lens system) and to move one lens group in directions perpendicular to the optical axis. This technique is particularly suitable to large cameras as the lens group is of low size and inertia as compared to the remainder of the camera.

An alternative technique is to keep the lens system still, and to move the image sensor in directions perpendicular to the optical axis.

Although these techniques are successful in relatively large camera apparatuses such as digital still cameras, they are difficult to miniaturise. The very tight packaging of components in miniature camera apparatuses presents great difficulties in adding OIS actuators, or indeed any other actuators, within the desired package.

WO-2010/029316 and WO-2010/089529 disclose camera apparatuses employing a different technique in which OIS is achieved by tilting a camera unit comprising an image sensor and a lens system relative to a support structure. In each case, tilting is driven by an SMA actuator system comprising two SMA actuator subsystems each comprising two SMA wires disposed on opposite sides of the camera unit and connected between the camera unit and the support structure. Each SMA wire is connected, at two ends, either to the camera unit or to the support structure and, intermediate the two ends, hooked over a pivot element provided on the other of the camera unit or the support structure. Thus, the pivot elements of the two SMA wires of each SMA actuator subsystem define a pivot axis in respect of that SMA actuator subsystem that is perpendicular to the optical axis, the pivot axes of the two SMA actuator subsystems being perpendicular to each other. Differential contraction of the SMA wires of each SMA actuator subsystem drives rotation of the camera unit around the pivot axis of the other SMA actuator subsystem.

Use of SMA wires to tilt the camera unit is advantageous in a miniature camera where the size and inertia of the camera unit is relatively small. Furthermore, it is beneficial to separate the OIS function from the other camera functions, because it is unnecessary to alter the complex internal design of the camera unit, such as the highly toleranced optical components. By using SMA wire as an actuator, there is achieved the advantage of SMA material of a very high energy density (mechanical energy available for a given mass of material). This allows the actuator system to be extremely small and conversely to deliver high forces.

The first aspect of the present invention relates to an apparatus in which the two SMA actuator subsystems, on common contraction of the SMA wires thereof, drive displacement of the camera unit in opposite directions along the optical axis relative to the support structure, for example as disclosed in WO-2010/089529.

The present invention also avoids or at least reduces the requirement for any biasing force to be provided to act against the contraction of the SMA actuators, because each SMA actuator subsystem provides a force opposing contraction of the other. A biasing element may be avoided altogether or, if provided, may be reduced in size as compared to an equivalent system in which all the actuators drive movement of the camera unit in the same direction along the optical axis. Similarly, if the camera unit is suspended by flexures, the requirement for this to provide a biasing force is reduced, thereby simplifying the design.

The first aspect of the present invention is concerned with reducing the height of the camera apparatus in the direction along the optical axis in a camera apparatus where OIS is provided using an SMA actuator system to drive tilting of the camera unit. Demands for miniaturisation make it highly desirable to minimise the size of the camera apparatus, in particular the height in the direction along the optical axis because a camera apparatus is often integrated into the face of a generally planar device that is desired to be slim. The need to provide a clearance for accommodating the tilting movement of the camera unit increases the overall height compares to a camera apparatus in which the camera unit is static.

The constraints on height become even more acute in a camera apparatus including an additional actuator system for moving a lens element along the optical axis, for example to provide autofocussing, because this additional actuator system typically needs to be mounted above the SMA actuator system.

According to a first aspect of the present invention, there is provided a camera apparatus comprising:

a support structure;

a camera unit comprising an image sensor and a lens system for focussing an image on the image sensor; and an SMA actuator system comprising two SMA actuator subsystems each comprising two pairs of lengths of SMA wire connected between the camera unit and the support structure, the pairs being disposed on opposite sides of the camera unit and the lengths of SMA wire in each pair being connected at a common point to either the camera unit or the support structure, the camera unit being arranged to pivot relative to the support structure about respective pivot axes extending through the common points in respect of the two pairs of lengths of SMA wire in each SMA actuator subsystem, the pivot axes of the two SMA actuator subsystems being perpendicular to the optical axis and to each other and lying in a common plane along the optical axis, each SMA actuator subsystem being arranged, on differential contraction of the SMA wires thereof, to drive rotation of the camera unit around the pivot axis of the other SMA actuator subsystem, the two SMA actuator subsystems being arranged, on common contraction of the SMA wires thereof, to drive displacement of the camera unit in opposite directions along the optical axis relative to the support structure, wherein the lengths of SMA wire in each pair of one of the SMA actuator subsystems is connected at a common point to the camera unit and the lengths of SMA wire in each pair of the other of the SMA actuator subsystems is connected at a common point to the support structure.

It is desirable to arrange the pivot axes of the two SMA actuator subsystems to lie in a common plane along the optical axis. In this case, there is a "virtual" pivot, since the two SMA actuator subsystems together define the position of the camera along the optical axis, such that no pivot or gimbal mechanism is required. If the pivot axes of the two SMA actuator subsystems are separated along the optical axis then the provision of resistance to lateral motion, for example using a flexure arrangement, is more difficult because tilting of the camera unit about one of the pivot axes causes lateral motion of the camera unit at the position along the optical axis of the other pivot axis.

The first aspect of the present invention minimises the height along the optical axis required to accommodate the SMA actuator system whilst simultaneously arranging the pivot axes of the two SMA actuator subsystems to lie in a common plane along the optical axis. This is achieved by the lengths of SMA wire in each pair not all being connected at a common point to the camera unit, as is the case in the arrangements disclosed in WO-2010/089529. Instead, the lengths of SMA wire in each pair of one of the SMA actuator subsystems is connected at a common point to the camera unit and the lengths of SMA wire in each pair of the other of the SMA actuator subsystems is connected at a common point to the support structure.

The reason why the height required to accommodate the SMA actuator system is reduced is as follows. If the lengths of SMA wires of each pair are connected at a common point to the same one of the support structure or the camera unit, then the pairs of lengths SMA wire of the two SMA actuator subsystems extend away from the aligned pivot axes in different directions, and are hence not aligned along the optical axis. This results from the fact that the two SMA actuator subsystems, on common contraction of the lengths of SMA wire thereof, drive displacement of the camera unit in opposite directions along the optical axis relative to the support structure. However it has been appreciated that if the lengths of SMA wire of the two SMA actuator subsystems are connected at a common point to different ones of the support structure and the camera unit, then the lengths of SMA wire of the two SMA actuator subsystems may be aligned along the optical axis, whilst maintaining the alignment of the pivot axes in a common plane along the optical axis. Effectively, as a result of differently connecting the two SMA actuator subsystems, one of the SMA actuator subsystems may be flipped, so that both the two SMA actuator subsystems align.

The second and third aspects of the present invention relate to the provision of a flexure arrangement connected between the support structure and the camera unit in a camera apparatus that provides OIS using an SMA actuator system to drive tilting of the camera unit. Such a flexure arrangement, typically comprising a plurality of flexures, is advantageously arranged to provide a greater degree of resistance to movement laterally to the optical axis than to movement along the optical axis, and thereby assist in supporting the camera unit and guiding its movement, as follows.

In one case, the two SMA actuator subsystems, on common contraction of the lengths of SMA wire thereof, drive displacement of the camera unit in opposite directions along the optical axis relative to the support structure, for example as disclosed in WO-2010/089529. In this case, there is a "virtual" pivot, since the two SMA actuator subsystems together define the position of the camera along the optical axis, such that no pivot or gimbal mechanism is required. However, since the controllable forces and motions of the SMA actuators are all substantially parallel to the optical axis, there is relatively little stability to base excitations vibrating the camera unit laterally to the optical axis. On this basis, it is beneficial to provide a flexure arrangement providing a greater degree of resistance to movement laterally to the optical axis than to movement along the optical axis, to minimise linear motions laterally of the optical axis, but to allow movement along the optical axis.

In another case, all the SMA wires, on contraction, drive displacement of the camera unit in the same direction along the optical axis relative to the support structure, for example as disclosed in WO-2010/029316. In this case, the flexure arrangement may act as a biasing element providing a biasing force against contraction of the SMA wires. Alternatively a separate biasing element may be provided, but a flexure arrangement is still advantageously included for stability by providing resistance against motion laterally to the optical axis.

The second and third aspects of the present invention is concerned with the design of a flexure arrangement to provide this function.

According to a second aspect of the present invention, there is provided a camera apparatus comprising:

a support structure;

a camera unit comprising an image sensor and a lens system for focussing an image on the image sensor;

an SMA actuator system comprising two SMA actuator subsystems each comprising two pairs of lengths of SMA wire disposed on opposite sides of the camera unit and connected between the camera unit and the support structure, the lengths of SMA wire in each pair being connected at a common point to either the camera unit or the support structure, the camera unit being arranged to pivot relative to the support structure about respective pivot axes extending through the common points in respect of the two pairs of lengths of SMA wire in each SMA actuator subsystem, the pivot axes of the two SMA actuator subsystems being perpendicular to the optical axis and to each other and lying in a common plane along the optical axis, each SMA actuator subsystem being arranged, on differential contraction of the SMA wires thereof, to drive rotation of the camera unit around the pivot axis of the other SMA actuator subsystem; and a flexure arrangement connected between the support structure and the camera unit and arranged to provide a greater degree of resistance to movement laterally to the optical axis than to movement along the optical axis, wherein the flexure arrangement is connected to the camera unit at a position in the common plane in which the pivot axes of the two SMA actuator subsystems lie.

It has been appreciated that there is particular advantage to arranging the SMA actuator subsystems so that their two pivot axes lie in a common plane along the optical axis, and at the same time arranging the flexure arrangement to be connected to the camera unit at a position in that common plane. This is for the following reasons.

Consider a notional camera apparatus in which either one or both of the pivot axes is separated from the flexure arrangement along the optical axis. This is inevitable if the pivot axes are separated along the optical axis. It can occur even if the pivot axes lie in a common plane along the optical axis, for example if the pivot axes lie centrally along the optical axis and the flexure arrangement is arranged at an end of the camera unit. In such a situation, it may be appreciated that the camera unit may move laterally at the position of the flexure element when it tilts about the separated pivot axis. Therefore, the flexure element resists the tilting forces generated by the lengths of SMA wire, and hence curtails the desired motion. This effect is reduced if the flexure arrangement is connected to the camera unit at the same position along the optical axis as the pivot axis concerned. It follows that the pivot axis of both SMA actuator subsystems should lie in a common plane, so that this benefit can be achieved for tilting about both pivot axes. As a result, the two SMA actuator subsystems producing two tilting degrees of freedom combine to give a single pivot point for all resulting tilting motions around the two orthogonal pivot axes.

According to a third aspect of the present invention, there is provided a camera apparatus comprising:

a support structure;

a camera unit comprising an image sensor and a lens system for focussing an image on the image sensor;

an SMA actuator system connected between the camera unit and the support structure and arranged to drive rotation of the camera unit around two notional axes that are perpendicular to each other and to the optical axis; and a non-conductive substrate supporting conductive tracks that are electrically connected to the camera unit, the substrate being mechanically connected between the camera unit and the support structure and having a portion therebetween configured as a flexure arrangement that provides a greater resistance to movement laterally of the movement axis than to movement along the movement axis.

The third aspect of the present invention therefore makes use of the fact that it is necessary to make electrical connections to the camera unit. The camera unit carries the image sensor and so it is necessary to make electrical connections to that, to power the image sensor, exchange information and transmit the image data. Furthermore, it may be necessary or desired to make electrical connections to the SMA actuator system on the camera unit, instead of or alternatively to the support structure, depending on the configuration of the SMA actuator system. This necessitates provision of an electrical connection from the static support structure to the movable camera unit. Such electrical connection is straightforward to achieve, for example using a flexible connector such as a wire. However, the mechanical properties of such flexible connector may introduce stiffness that adversely affects the movement of the camera unit. This can be minimised by appropriate design of the flexible connector, but is nonetheless problematic because it will be impossible to make the flexible connector entirely compliant.

However, with the third aspect of the present invention, the electrical connection to the camera unit is provided by a non-conductive substrate supporting conductive tracks that in addition is mechanically connected between the camera unit and the support structure and configured as the flexure arrangement. Such a configuration may be achieved by forming the non-conductive substrate from a suitable material and shaping it appropriately, for example shaping the portion between the camera unit and the support structure as a plurality of flexures. For example, the conductive tracks may be formed as a printed circuit and it has been appreciated that typical materials used for a flexible printed circuit, as opposed a normal rigid printed circuit, are particularly suitable. In this manner, the means carrying the electrical connection to the camera unit may instead be designed to provide the desired mechanical properties of a flexure element, rather than trying to minimise its impact mechanically. Conversely, it is not necessary to provide a separate flexure arrangement formed as an additional element, as for example in the arrangements disclosed in WO-2010/029316 and WO-2010/089529. Accordingly, the overall construction and component count is reduced.

The fourth aspect of the present invention is concerned with reducing the height of the camera apparatus in the direction along the optical axis. Demands for miniaturisation make it highly desirable to minimise the size of the camera apparatus, in particular the height in the direction along the optical axis because a camera apparatus is often integrated into the face of a generally planar device that is desired to be slim. The height of the miniature camera is one of its most important parameters and there is a strong pressures for portable electronic devices, and hence incorporated camera apparatuses, to be as thin as possible.

The constraints on height become more acute in a camera apparatus where OIS is provided using an actuator system, for example an SMA actuator system, to drive tilting of the camera unit. In that case, the need to provide a clearance for accommodating the tilting movement of the camera unit increases the overall height compared to a camera apparatus where the image sensor is static.

The constraints on height become more acute in a camera apparatus including an additional actuator system for moving a lens element along the optical axis, for example to provide autofocussing, because this additional actuator system typically needs to be mounted in front of the SMA actuator system.

According to a fourth aspect of the present invention, there is provided a camera apparatus comprising:

an image sensor having a photo-sensitive area on its front side for sensing an image, and further comprising terminals on its front side;

a lens system arranged in front of the image sensor for focussing an image on the photo-sensitive area of the image sensor;

an intermediate connector element arranged in front of the image sensor and having an opening allowing focusing of an image on the photo-sensitive area of the image sensor, the intermediate connector element incorporating conductive tracks extending between opposite faces of the intermediate connector element, the conductive tracks being connected on a first one of the faces to the terminals on the front side of image sensor; and a non-conductive substrate arranged in front of the intermediate connector inside the height of the lens system along the optical axis, the non-conductive substrate supporting conductive tracks for routing signals from the image sensor to a processing circuit, the conductive tracks of the intermediate connector element being connected on the second one of the faces to the conductive tracks of the non-conductive substrate, optionally through a further connector element.

A camera apparatus typically requires a non-conductive substrate, such as a circuit board, supporting conductive tracks for routing signals from the image sensor to a processing circuit.

The fourth aspect of the present invention makes use of an intermediate connector element incorporating conductive tracks extending between its opposite faces to provide a non-conductive substrate arranged in front of the intermediate connector inside the height of the lens system along the optical axis. Such a configuration leads to an advantage in camera height compared to the most common known method of mounting an image sensor on such a non-conductive substrate.

The most common known method is to mount an image sensor on a non-conductive substrate that is a printed circuit board (PCB) arranged behind the image sensor, with electrical connections from the image sensor to the PCB made using wire bonds. This PCB has a discrete thickness, typically of the order of 0.4 mm. This thickness adds directly to the height of the camera apparatus, A technique considered by the inventors is to similarly mount an image sensor on a non-conductive substrate that is a flexible printed circuit (FPC). The FPC itself can be made thinner than a PCB, for example being of the order 0.1 mm thick, but still adds directly to the height of the camera apparatus. Furthermore, the FPC generally requires a stiffener, that is typically a steel plate, which is thicker than the FPC, typically being of the order of 0.2 mm or more thick. Such a thickness of the stiffener is required because of the differential thermal expansion of the image sensor which is made of a semiconductor such as silicon and the stiffener which is typically made of steel, resulting from the substantial electrical power dissipated in the image sensor.

A further technique considered by the inventors is to incorporate the image sensor in a Chip Scale Package (CSP), where techniques are used to encapsulate the image sensor to help mitigate dust on the semiconductor material, whilst allowing the underside of the package to have solder bumps, avoiding the need for wire bonds. However this integration technique also requires a non-conductive substrate such as a PCB or FPC and stiffener onto which the image sensor is mounted. This technique helps with dust, and also helps minimise the footprint of the image sensor, and hence the footprint of the camera apparatus, but it does not help reduce the height of the camera apparatus.

A final technique considered by the inventors is to connect the image sensor to a non-conductive substrate that is a PCB via a ceramic substrate. The material of the ceramic substrate has a closer thermal expansion to the silicon, which provides thermal benefits. A subset of this technique would be to use a flip-chip technique, in which the image sensor is mounted into a recess on the back of a ceramic substrate, requiring the ceramic substrate to have an opening allowing focusing of an image on the photo-sensitive area of the image sensor. However, in existing designs incorporating ceramic substrates with silicon devices to provide thermal benefits, the PCB is still provided at the rear of the silicon device and ceramic substrate, by means of the ceramic device being provided with conductive tracks routed to pads on the rear of the substrate where connection is made to the PCB.

Compared to these techniques the fourth aspect of the present invention allows a non-conductive substrate to be arranged in front of the intermediate connector inside the height of the lens system along the optical axis, without the non-conductive substrate adding to the height. Thus the height is reduced compared to these techniques in which a PCB or FPC is provided behind the image sensor.

The intermediate connector element may comprise a substrate through which the conductive tracks extend, for example a substrate comprising ceramic material. Furthermore, the conductive tracks may be connected to the terminals on the front side of the image sensor by solder bumps. In this manner, the intermediate connector element may be implemented using similar technology to the final technique considered by the inventors discussed above, for example using flip-chip technology, but with the difference that the conductive tracks of the intermediate connector element are routed to the front face opposite the image sensor to allow connection to be made to the non-conductive substrate.

The camera apparatus may be one in which OIS is provided by at least the image sensor and the lens system together constituting a camera unit, and there being provided an actuator system, for example an SMA actuator system, connected between the camera unit and a support structure and arranged to drive rotation of the camera unit around two notional axes that are perpendicular to each other and to the optical axis.

In that case the camera apparatus may include screening can behind the image sensor, for protective purposes, for example to prevent dust ingress, EMC and/or physical damage with the moving image sensor. By necessity, there is a clearance gap between the screening can and the image sensor, to allow for the movement of the image sensor. Nonetheless, the overall height is reduced as the screening can be positioned closer to the image sensor as compared to there being a non-conductive substrate fixed to the rear of the image sensor.

However, as the connections are made to the non-conductive substrate in front of the image sensor, the need for a protective screening can is reduced. Therefore in some designs, the camera apparatus may omit a screening can behind the image sensor, thereby realising a further reduction in height.

Where OIS is provided by an actuator system tilting the camera unit, the non-conductive substrate may be mechanically connected between the camera unit and the support structure and having a portion therebetween configured as a flexure arrangement that provides a greater resistance to movement laterally of the movement axis than to movement along the movement axis. In that case the camera apparatus may also be in accordance with the third aspect of the invention. Accordingly, the features of the third and fourth aspects of the present invention may be freely combined in any combination.

With all the aspects of the present invention, the SMA actuator system may be driven to provide optical image stabilisation by supplying thereto drive signals that may be generated in response to output signals of a vibration sensor, mounted on the camera unit or the support structure, representative of the vibration of the camera unit.

The four aspects of the present invention, and the individual features of each aspect, may be applied together in any combination.

To allow better understanding, embodiments of the present invention will now be described by way of non-limitative example with reference to the accompanying drawings, in which:

FIGS. 7 to 9 are perspective views of successive stages of the assembly of the chassis and the carriage plate with the FPC substrate and the SMA actuator system;

FIGS. 14 and 15 are top and bottom perspective views of the assembly of FIG. 13;

FIG. 16 is an exploded perspective view of the assembly of FIG. 13 and a flexible printed circuit assembly;

Figure 1:
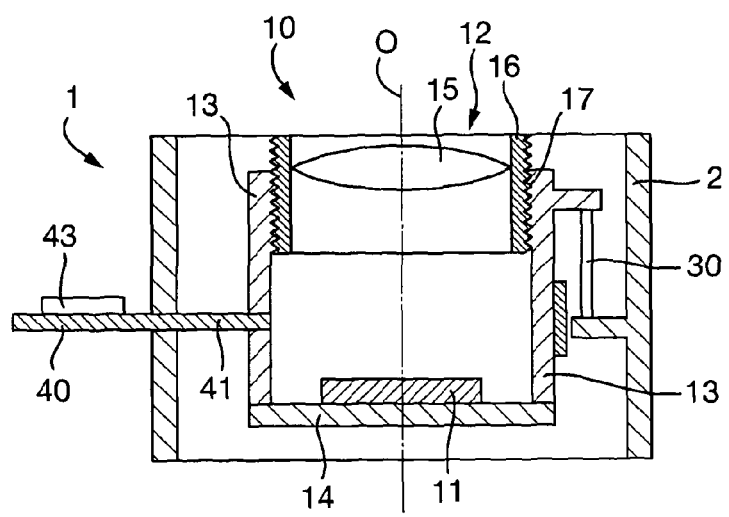
FIG. 1 is a schematic cross-sectional view of a camera apparatus.

A camera apparatus 1 arranged to perform OIS is shown in FIG. 1 which is a schematic cross-sectional view, the cross-section being taken along the optical axis O of the camera apparatus 1, that is drawn schematically to illustrate the functional relationship between the components.

The camera apparatus 1 is to be incorporated in a portable electronic device such as a mobile telephone, media player or portable digital assistant. Thus miniaturisation is an important design criterion.

The camera apparatus 1 comprises a support structure 2 and a camera unit 10 that is supported on the support structure 2 by a flexible printed circuit (FPC) substrate 40 that is mechanically connected between the camera unit 10 and the support structure 2. As described in more detail below, the portion of the FPC substrate 40 between the camera unit 10 and the support structure 2 is configured as a flexure arrangement 41 that provides a greater resistance to movement laterally of the optical axis than to movement along the optical axis. In FIG. 1, the camera unit 10 and the support structure 2 are shown as being separated radially of the optical axis O for ease of understanding, whereas in fact these components overlap as will be described below.

The camera apparatus also includes an SMA actuator system 30 connected between the support structure 2 and the camera unit 10 to drive movement of the camera unit 10 relative to the support structure 2. The SMA actuator system 30 is also described in detail below.

The camera unit 10 is a functional camera and comprises an image sensor 11 and a lens system 12, both supported on a carriage 13.

The image sensor 11 is mounted and connected to a printed circuit board (PCB) 14 fixed to the bottom of the carriage 13. The image sensor 11 has a photo-sensitive area on its front side which senses the image. The lens system 12 is arranged in front of the image sensor 11 along the optical axis O so that the lens system 12 focuses an image onto the photo-sensitive area of the image sensor 11. The image sensor 11 captures the image and may be of any suitable type for example a CCD (charge-coupled device) or a CMOS (complimentary metal-oxide-semiconductor) device.

The lens system 12 comprises at least one lens 15 (a single lens 15 being shown in FIG. 1 for clarity, but plural lenses 15 being optionally provided) fixed in a lens holder 16 that is mounted inside the carriage 13 on an internal screw thread 17 formed inside the carriage 13. Both the carriage 13 and the lens holder 16 may be made from moulded plastic. The camera apparatus 1 is a miniature camera in which the at least one lens 15 has a diameter of at most 10 mm. For example a typical diameter of the at least one lens 15 is 6.5 mm. As a result of its small size, it is straightforward to move the camera unit 10 by the SMA actuator system 30 to provide OIS.

As described further below, OIS is provided by tilting the entire camera unit 10 around axes that are perpendicular to the optical axis O, with the advantage that the internal construction of the camera unit 10 need not be adapted for this purpose. Thus, the camera unit 10 may be a functionally standard camera. Thus, irrespective of the OIS function, the camera unit 10 may have any desired construction to provide the desired optical performance, possibly varying from that described herein. For example, the camera unit 10 may include a lens system 12 comprising a single lens or plural lenses as needed to provide the desired balance of optical performance and cost. Similarly the lens system 12 may provide a fixed focus or a variable focus. In the latter case, the camera unit 10 may employ any suitable construction for varying the focus, including the use of an SMA actuator system. For example, the camera unit 10 may be a camera of the type described in WO-2007/113478, WO-2008/099156, WO-2009/056822 or WO-2010/089526.

The camera apparatus 1 will now be described in detail with reference to FIGS. 2 to 8 which show different elements thereof. The terms "upper" and "lower", etc. will be used with reference to the orientation shown in the drawings and do not imply any particular orientation of the camera apparatus 1 in use.

Figure 2:
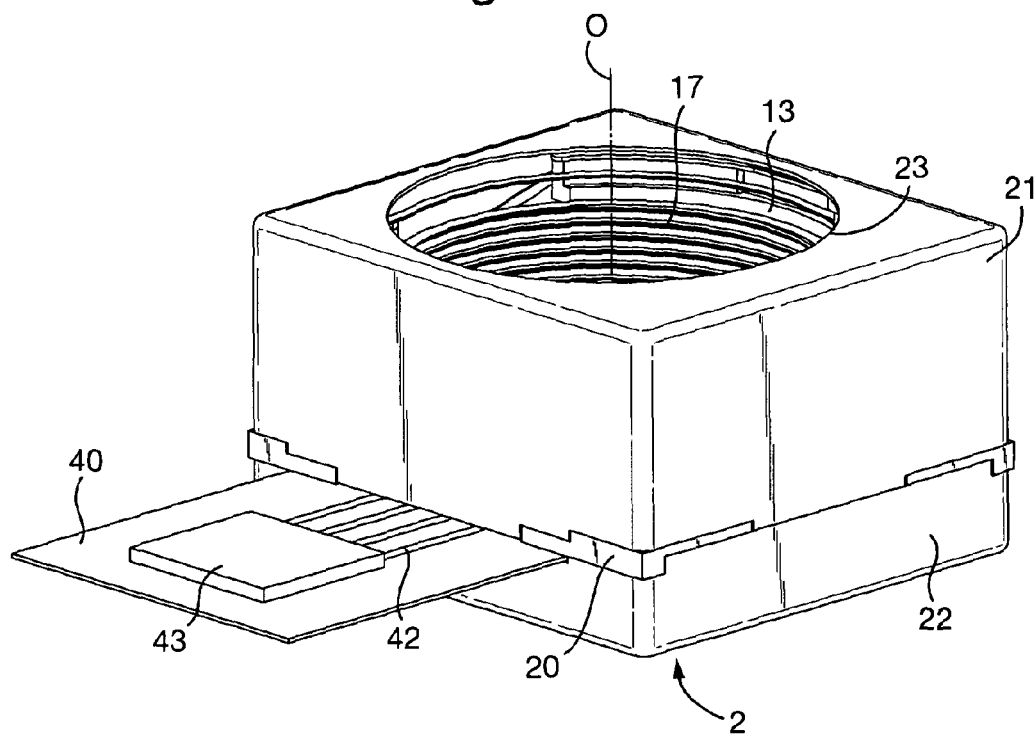
FIG. 2 is a perspective view of the camera apparatus omitting the lens holder.

FIG. 2 is a perspective view of the entire camera apparatus 1, omitting the lens holder 16 for clarity, and showing in particular the support structure 2. In particular, the support structure 2 comprises a chassis 20 to which is connected a top can 21 and a bottom can 22 that cover and protect the camera apparatus. As such the chassis 20 is obscured in FIG. 2. The top can 21 includes an aperture 23 aligned with the optical axis O through which light enters the camera apparatus 1. Through the aperture 23, the screw thread 17 of the carriage 13 is visible.

FIG. 2 also illustrates the FPC substrate 40 which extends into the camera apparatus 1 between the top can 21 and the bottom can 22. The FPC substrate 40 supports conductive tracks 42 that are electrically connected to an integrated circuit (IC) chip 43. The conductive tracks 42 extend from the integrated circuit (IC) chip 43 into the camera apparatus 1 where they are electrically connected to the camera unit 10 as described further below.

Figure 3:
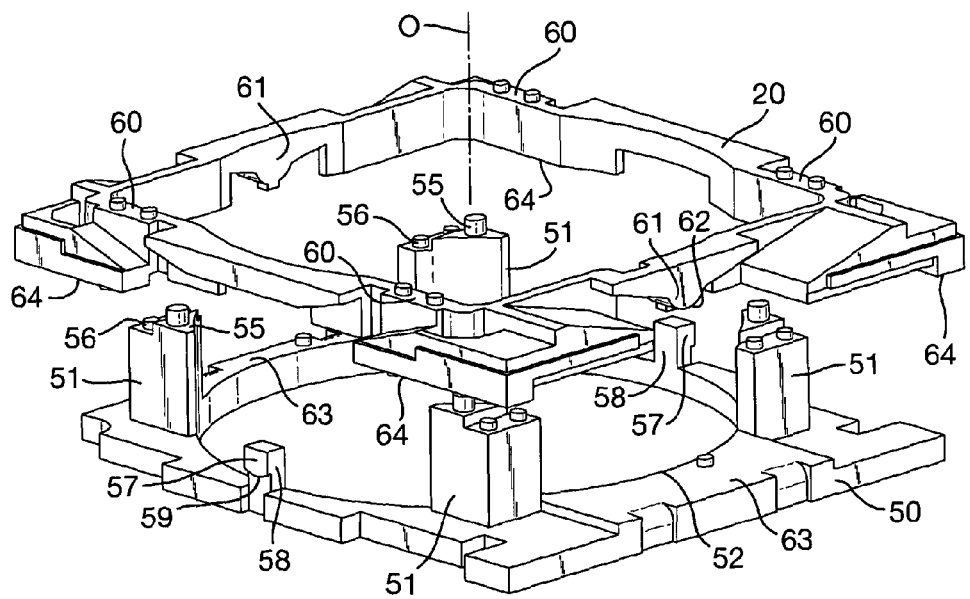
FIG. 3 is a perspective, exploded view of the chassis and the carriage plate of the camera apparatus.
Figure 4:
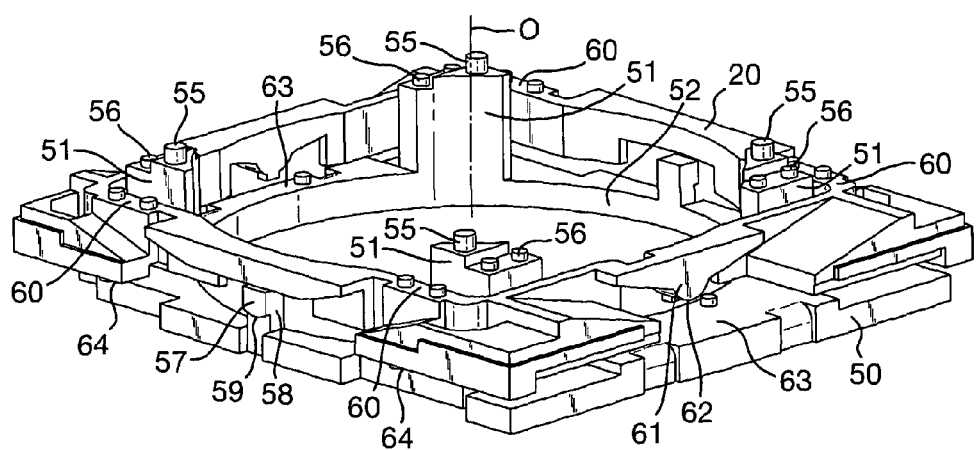
FIG. 4 is a perspective view of the chassis and the carriage plate of the camera apparatus in their proper relative positions.

FIGS. 3 and 4 illustrate the chassis 20 and the carriage plate 50 that forms part of the carriage 13, FIG. 3 being an exploded view and FIG. 4 showing the chassis 20 and the carriage plate 50 in their relative positions when assembled, in which state there is sufficient clearance to allow tilting movement of the carriage plate 50 relative to the chassis 20. The chassis 20 and the carriage plate 50 may be moulded, for example from a plastic. Both the chassis 20 and the carriage plate 50 are of a generally square shape as viewed along the optical axis O extending in a loop around the optical axis O, and both overlap radially of the optical axis O. In the assembled camera apparatus 1, the PCB 14 is fixed to the lower side of the chassis 20 with the image sensor 11 in the central aperture 52 thereof. The carriage plate 50 is provided with four posts 51 that protrude through the central aperture 52 of the chassis 20. Each post 51 has an assembly mount 55 and a crimp mount 56 provided on its uppermost surface. The carriage plate 50 is also provided with two pivot elements 57 on opposite sides of the carriage plate 50. Each pivot element 57 is provided on a pillar 58 that protrudes upwardly from the carriage plate 50 and overhanging with a lowermost arcuate pivot surface 59. The carriage plate 50 is further provided with two flexure mounts 63 on its upper surface on the two sides that do not support pivot elements 57.

The chassis 20 is also provided with four crimp mounts 60 on its uppermost surface. Furthermore, the chassis 20 is also provided with two pivot elements 61 on opposite sides of the chassis 20 aligned with the sides of the carriage plate 50 which are not provided with the two pivot elements 57. Each pivot element 61 is provided with a lowermost arcuate pivot surface 62. The chassis 20 is further provided with two flexure mounts 64 on its lower surface on the two sides that do not support pivot elements 61.

In the assembled camera apparatus 1, the pivot elements 57 and 61 on the carriage plate 50 and the chassis 20, are aligned along the optical axis O, so that their arcuate pivot surfaces 59 and 62 lie in a common plane perpendicular to the optical axis O. Furthermore, in the assembled camera apparatus 1, the flexure mounts 63 and the flexure mounts 64 are aligned with each other, and with the pivot elements 57 and 61 along the optical axis O (that is substantially aligned, the flexure mounts 63 and 64 being separated by the thickness of the FPC substrate 40 attached thereto as described below).

Figure 5:
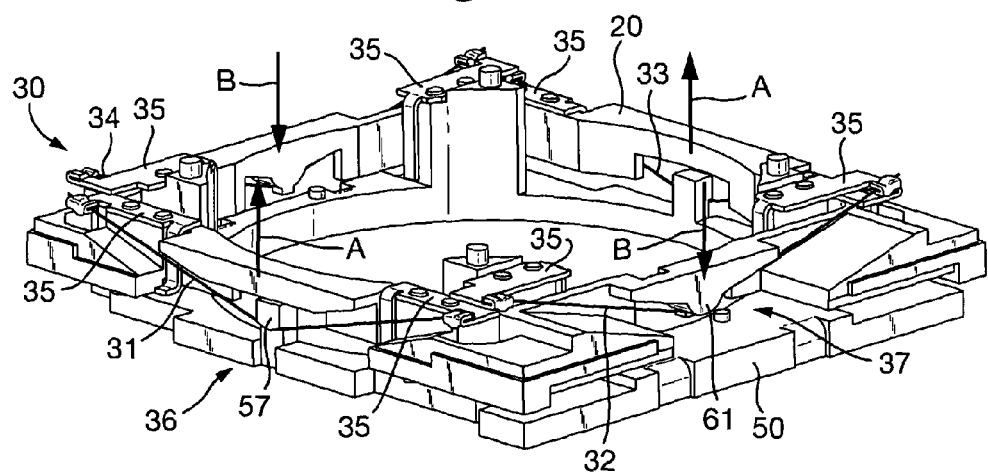
FIG. 5 is a perspective view of the chassis and the carriage plate of the camera apparatus including the SMA actuator system.

FIG. 5 illustrates the chassis 20 and the carriage plate 50 with the SMA actuator system 30 mounted thereto, in this case omitting the FPC substrate 40 for clarity.

The SMA actuator system 30 comprises four SMA wires 31 to 34 each being a piece of SMA wire arranged on one of the four sides of the camera apparatus 1, with an overall bowstring V-shape. Two of the SMA wires 31 and 32 are fully visible in FIG. 5, the other SMA wires 33 and 34 on the opposite sides of the camera unit 10 being mirror images thereof in perpendicular notional planes through the optical axis O. As the SMA wires 31 to 34 each extend along a side of the camera unit 10, the first pair of SMA wires 31 and 33, that are parallel to each other on opposite sides of the camera unit, extend perpendicular to the second pair of SMA wires 32 and 34, that are also parallel to each other on opposite sides of the camera unit. For ease of reference, the first pair of SMA wires 31 and 33 and the second pair of SMA wires 32 and 34 be will be referred to, respectively, as first and second SMA actuator subsystems 36 and 37 of the SMA actuator system 30.

Each SMA wire 31 to 34 is mounted between two crimping members 35 that crimp the SMA wires 31 to 34 at each end, thereby providing a mechanical terminal. In addition, the crimping members 35 provide electrical connections to the SMA wires 31 to 34, allowing a drive current to be supplied through the SMA wires 31 to 34.

The crimping members 35 of the SMA wires 31 and 33 of the first SMA actuator subsystem 36 are each fixed, at their two ends, to the crimp mounts 60 of the chassis 20, whereby the SMA wires 31 and 33 are connected to the support structure 2. These SMA wires 31 and 33 are, intermediate their ends, hooked over the two pivot elements 57 of the carriage plate 50, in particular being against the arcuate pivot surfaces 59, whereby the SMA wires 31 and 33 are connected to the camera unit 10. Optionally, the SMA wires 31 and 33 may be fixed to the pivot elements 57, for example by adhesive, but even in the absence of that are effectively connected to the pivot element 57 by being held in tension.

In overview, the portions of each SMA wire 31 and 33 on either side of the pivot elements 57 form lengths of SMA wire connected between the support structure 2 and the camera unit 10, being connected to the camera unit 10 at a common point, that is at the point of the pivot element 57. Thus, the camera unit 10 is able to pivot about a pivot axis of the first SMA subsystem 36 defined between the pivot elements 57. Due to the pivot elements 57 being aligned on opposite sides of the carriage plate 50, that pivot axis is perpendicular to the optical axis O.

Conversely, the crimping members 35 of the SMA wires 32 and 34 of the second SMA actuator subsystem 37 are each fixed, at their two ends, to the crimp mounts 56 of the carriage plate 50, whereby the SMA wires 32 and 34 are connected to the camera unit 10. These SMA wires 32 and 34 are, intermediate their ends, hooked over the two pivot elements 61 of the chassis 20, in particular being against the arcuate pivot surfaces 62, whereby the SMA wires 32 and 34 are connected to the support structure 2. Optionally, the SMA wires 32 and 34 may be fixed to the pivot elements 61, for example by adhesive, but even in the absence of that are effectively connected to the pivot element 61 by being held in tension.

In overview, the portions of each SMA wire 32 and 34 on either side of the pivot elements 61 form lengths of SMA wire connected between the support structure 2 and the camera unit 10, being connected to the support structure 2 at a common point, that is at the point of the pivot element 61. Thus, the camera unit 10 is able to pivot about a pivot axis of the second SMA subsystem 37 defined between the pivot elements 61. Due to the pivot elements 61 being aligned on opposite sides of the chassis 20, that pivot axis is perpendicular to the optical axis O, as well as being perpendicular to the pivot axis of the first SMA subsystem 36. Although in this camera apparatus 1, each SMA wire 31 to 34 is a single piece of SMA wire, a similar effect could be achieved by alternatively replacing each SMA wire 31 to 34 by two separate pieces of SMA wire each connected between the support structure 2 and the camera unit 10 in substantially the same arrangement.

The fixing of the crimping members 35 to the crimp mounts 56 and 60 may be achieved by a mechanical fitting, strengthened by the use of adhesive. Alternatively, this mounting may be achieved by a heat staking process if the crimp mounts 56 and 60 are made from polymer material and have suitable heat deformable features to retain the crimping members 35.

Figure 6:
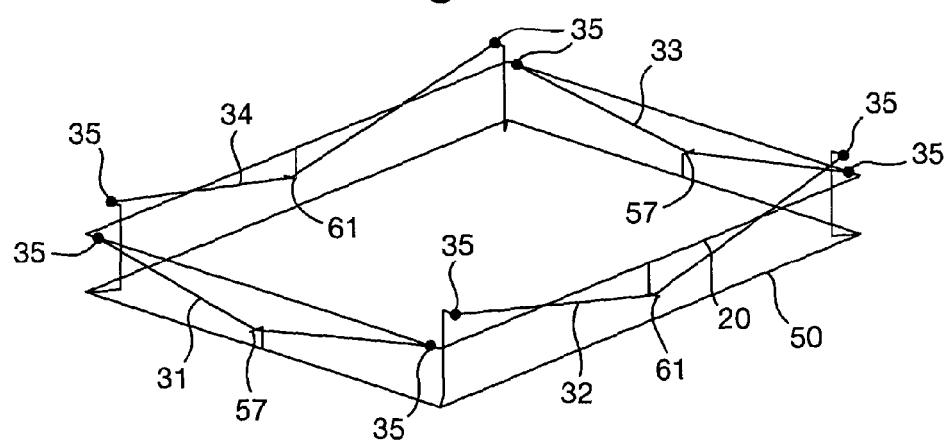
FIG. 6 is a schematic perspective view of the chassis and the carriage plate of the camera apparatus

In this regard, FIG. 6 is a schematic view of the chassis 20 and carriage plate 50 that illustrates the connections of the SMA wires 31 to 34 thereto. FIG. 6 shows how the SMA wires 31 and 33 of the first SMA actuator subsystem 36 are each fixed, at their two ends, by crimping members 35 to the chassis 20 and, intermediate their ends, hooked over the pivot elements 57 of the carriage plate 50. FIG. 6 further shows how the SMA wires 32 and 34 of the second SMA actuator subsystem 37 are each fixed, at their two ends, by crimping members 35 to the carriage plate 50 and, intermediate their ends, hooked over the pivot elements 61 of the chassis 20.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of an SMA wire 31 to 34 causes the stress therein to increase and the SMA wire 31 to 34 to contract. This causes movement of the camera unit 10. A range of movement occurs as the temperature of the SMA wire 31 to 34 increases over the range of temperature in which there occurs the transition of the SMA material from the Martensite phase to the Austenite phase. Conversely, on cooling of the SMA wire 31 to 34 so that the stress therein decreases, expansion of the SMA wire 31 to 34 allows the camera to move in the opposite direction. Thus, the position and orientation of the camera unit 10 relative to the support structure 2 along the optical axis O is controlled by varying the temperature of the SMA wires 31 to 34. This is achieved by passing through the SMA wires 31 to 34 a drive current that provides resistive heating. Heating is provided by the drive current. Cooling is provided by reducing or ceasing the drive current to allow the SMA wire 31 to 34 to cool by conduction to its surroundings.

The SMA wires 31 to 34 may be provided with a sufficient speed of response to provide OIS. Typically, each SMA wire 31 to 34 is proportionally driven so as to control the position over a frequency bandwidth up to 10 Hz, up to 20 Hz, or up to 30 Hz. A perceived drawback of SMA as an actuator is its slow response time. As the SMA wires 31 to 34 are thermally driven, the response time is limited by the temperature change achievable, being associated with thermal conductivity, specific heat capacity, and thermal mass. Whilst heating of the SMA wires 31 to 34 can be increased by increasing the power of the drive current, cooling is dependent on the thickness of the SMA wire 31 to 34. This thickness is selected to provide the desired response time during cooling. For example, if the SMA wires 31 to 34 are of thickness 25 µm, being currently the thinnest available commercial material, the thermal response begins to roll off at 4 Hz. Based on analysis of the OIS function, the functional requirement is to provide movement compensation over a bandwidth of up to 30 Hz. However, the amplitude of response required drops markedly over the operating bandwidth, so as to only require less movement (say less than 10 µm at over 20 Hz). In spite of the roll-off in SMA response above 4 Hz, the SMA wires 31 to 34 are still able to deliver the displacement requirements at 30 Hz, and so the SMA wire 31 to 34 are able to successfully meet the actuation requirements of the OIS for miniature cameras.

The SMA wires 31 to 34 may be made of any suitable SMA material, for example Nitinol or another Titanium-alloy SMA material. Advantageously, the material composition and pretreatment of the SMA wires 31 to 34 are chosen to provide phase change over a range of temperature that is above the expected ambient temperature during normal operation and as wide as possible to maximise the degree of positional control.

The lengths of SMA wire formed by the two portions of SMA wire 31 to 34 on either side of the pivot elements 57 and 61 extend between the camera unit 10 and the support structure 2 at an acute (non-zero) angle to the optical axis O, as viewed perpendicular to the optical axis O, preferably at an angle in the range from 70° to 80°. Each SMA wire 31 to 34 is held in tension, thereby applying a component of force in a direction along the optical axis O. The degree of displacement achievable is dependent on the strain developed within the SMA wire 31 to 34 and also on the acute angle of the two portions on either side of the pivot elements 57 and 61. The strain which may be developed in the SMA wires 31 to 34 is limited by the physical phenomenon of the phase change. Due to two portions of the SMA wires 31 to 34 extending at an acute angle to the optical axis O, the SMA wires 31 to 34 change in orientation when it changes in length. This provides mechanical amplification of the deformation so that the degree of displacement along the optical axis O is higher than the change in length of the SMA wire 31 to 34 resolved along the optical axis O.

The lengths of SMA wire formed by the two portions of SMA wire 31 to 34 on either side of the pivot elements 57 and 61 each extend perpendicular to a common notional line radial of the optical axis O, as viewed along the optical axis O, that is extending in the middle of the square sides of the camera apparatus 1. Thus each individual SMA wire 31 to 34 provides no component of force perpendicular to the optical axis O which is advantageous avoiding the application of sideways forces to the camera unit 10.

At the same time, the effect of differential and common contraction of the SMA wires 31 to 34 can be understood from FIG. 6 as follows.

Differential contraction of the SMA wires 31 and 33 of the first SMA actuator subsystem 36 drives rotation of the camera unit 10 around the pivot axis that is defined by the pivot elements 61 of the second SMA actuator subsystem 37. Similarly, differential contraction of the SMA wires 32 and 34 of the second SMA actuator subsystem 37 drives rotation of the camera unit 10 around the pivot axis that is defined by the pivot elements 57 of the first SMA actuator subsystem 36. Due to the arrangement of the SMA wires 31 to 34, the two pivot axes are perpendicular to each other and the optical axis O. Furthermore the SMA wires 31 to 34 are positioned with the pivot elements 57 and 61 aligned along the optical axis O, so that the two pivot axes lie in a common plane along the optical axis O. The configuration of the SMA actuator system 30 creates a desired virtual pivot for the camera unit 10, without the need for any pivot or gimbal mechanism, by operating all the SMA wires 31 to 34 with controlled drive signals. Hence, the SMA actuator system 30 as a whole may be driven to provide tilting about any arbitrary notional axis perpendicular to the optical axis O, by driving the first and second SMA actuator subsystems 36 and 37 in combination. The alignment of the pivot axes of the two SMA actuator subsystems 36 and 37 simplifies the design, because rotation about one pivot axis does not induce lateral motion of the other pivot axis, as would be the case if the pivot axes were separated along the optical axis O. The pivot axes could in principle be arbitrarily located along the optical axis, but are desirably located inside the camera unit 10, preferably at the centre of mass of the camera unit 10. This is to reduce the movement of inertia experienced by the SMA actuator system 30.

In addition, as a result of the SMA wires 31 and 33 of the first SMA actuator subsystem 36 being fixed to the chassis 20 and hooked over the carriage plate 50 and the SMA wires 32 and 34 of the second SMA actuator subsystem 37 being oppositely connected, that is fixed to the carriage plate 50 and hooked over the chassis 20, the first and second SMA actuator subsystems 36 and 37 are effectively opposed. Thus, on common contraction of the SMA wires 31 to 34, the first and second SMA actuator subsystems 36 and 37 apply force to the camera unit 10 in opposite directions along the optical axis O. That is, the first SMA actuator subsystem 36 applies force to the carriage plate 50 and hence the camera unit 10 in the direction of arrows A, whereas the second SMA actuator subsystem 37 applies force to the carriage plate 50 and hence the camera unit 10 in the direction of arrows B.

Thus, the first and second SMA actuator subsystems 36 and 37, on contraction, apply a stress to each other, in a manner that is functionally equivalent to the SMA actuator system 30 disclosed in WO-2010/089529. This provides similar advantages of removing or reducing the need for a separate biasing element acting against the SMA wires 31 to 34, and the SMA actuator system 30 itself acting to support the camera unit 10.

However, in contrast to WO-2010/089529, this functionality is achieved with the first and second SMA actuator subsystems 36 and 37 oppositely connected to the support structure 2 and the camera unit 10. As a result, the pivot axes of the first and second SMA actuator subsystems 36 and 37 can be aligned in a common plane along the optical axis O whilst simultaneously minimising the height of the camera unit 10 needed to accommodate the SMA wires 31 to 34. This height reduction follows from the opposite connection which results in all the SMA wires being in V-shapes that are in the same orientation, even though the first and second SMA actuator subsystems 36 and 37 provide a force to the camera unit 10 in different directions along the optical axis O. Thus, each SMA wire 31 to 34 is aligned and occupies the same height along the optical axis O. The projected height of each SMA wire 31 to 34 along the optical axis O is the cotangent of angle of the SMA wire 31 to 34 multiplied by the maximum projected length in the plane orthogonal to the optical axis O, which is itself usually determined by the footprint of the camera apparatus 1. Hence the height of each SMA wire 31 to 34 is fixed by the footprint and the geometry of the SMA wire 31 to 34, but by aligning the heights of all the SMA wires 31 to 34, the minimum height is needed to accommodate the entire SMA actuator system 30.

By way of contrast, if the first and second SMA actuator subsystems 36 and 37 were all connected to the same one of the support structure 2 and the camera unit 10, as in WO-2010/089529, and the pivot axes were aligned in a common plane along the optical axis O, then the SMA wires 31 and 33 of the first SMA actuator subsystem 36 would be oppositely oriented from the SMA wires 32 and 34 of the second SMA actuator subsystem 37, extending from the pivot axes in opposite directions and hence occupying twice the height along the optical axis O.

In addition, since the ends of the SMA wires 31 to 34 are all close to being co-planar, and separated from the notional average plane of the pivot elements 57 and 61, it is relatively easy to locate the flexures 45 and electrical connections close to the plane of the pivot elements 57 and 61, as described below.

The FPC substrate 40 and the flexure arrangement 41 provided thereby will now be described with reference to FIGS. 7 to 9 that illustrate the configuration of the FPC substrate 40 and its assembly into the camera apparatus 1.

The FPC substrate 40 is visible in FIG. 7 and includes a body 44 on which the IC chip 43 is mounted. The portion of the FPC substrate 40 adjacent the body 44 is configured as a flexure arrangement 41 that on assembly into the camera apparatus 1 is connected between the carriage plate 50 and the chassis 20, and is arranged as follows. The FPC substrate 40 is formed from a sheet of non-conductive material that is shaped to provide the following arrangement. The flexure arrangement 41 includes four flexures 45, two flexures 45a extending from the body 44 to respective carriage mounts 46, and two flexures 45b extending beyond the respective carriage mounts 46. The FPC substrate 40 further includes four chassis mounts 47, two chassis mounts 47a being provided on the body 44 adjacent the flexures 45a extending therefrom, and two chassis mounts 47b being provided on the distal end of the two flexures 45b that extend beyond the carriage mounts 46.

The carriage mounts 46 and chassis mounts 47 of the FPC substrate 40 are used to connect the flexures 45 to the carriage plate 50 and chassis 20 as follows. As shown in FIG. 7, the FPC substrate 40 is positioned over the carriage 50 and the carriage mounts 46 are fixed to the carriage 50. Then, the chassis 20 is positioned over the FPC substrate 40 and the chassis 50 is fixed to the chassis mounts 47. This leaves the flexures 45 extending between the chassis 20 and the carriage plate 50.

Figure 9:
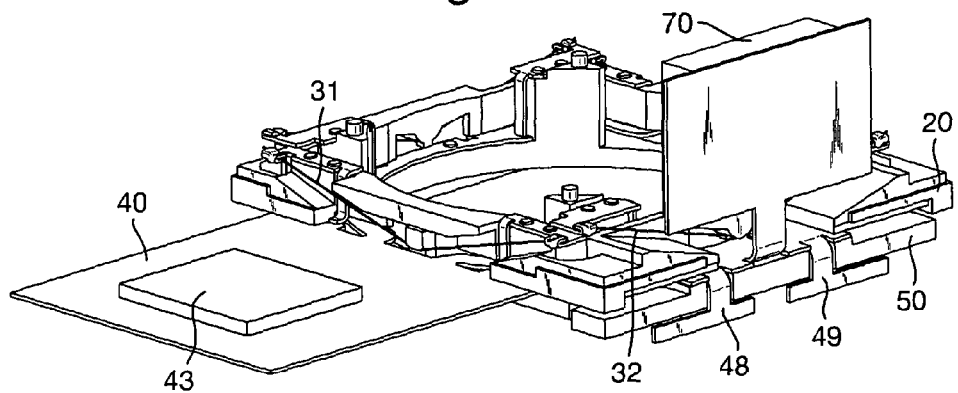
Figure 10:
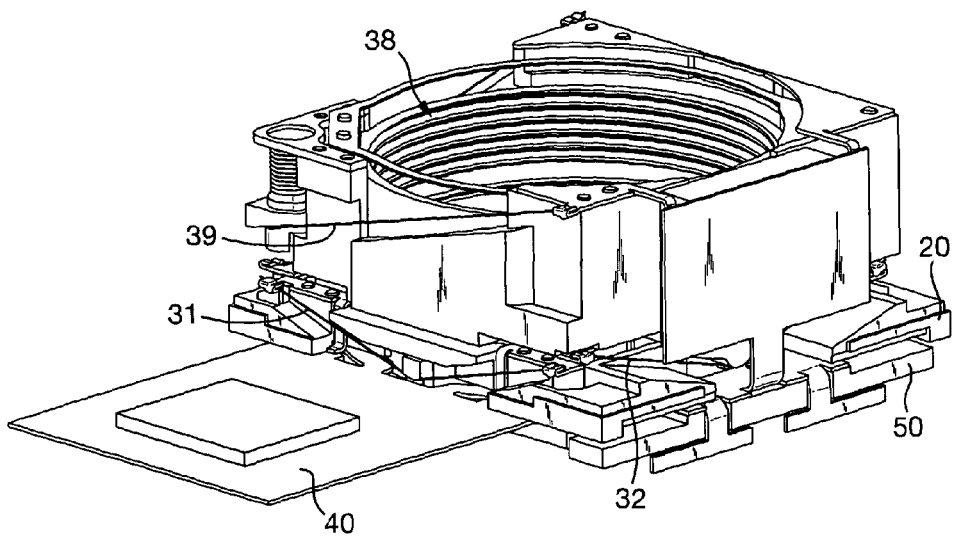
FIG. 10 is a perspective view of the chassis and carriage plate with the autofocus assembly.

Subsequently, the SMA wires 31 to 34 are attached to the chassis 20 and the carriage plate 50 as shown in FIG. 9. Lastly, as shown in FIG. 10, a carriage assembly 38 that forms part of the carriage 13 with the carriage plate 50 is attached to the carriage plate 50, in particular to the assembly mounts 55. In this example, the carriage assembly 38 incorporates an additional SMA wire 39 that is arranged to provide movement of the lens system 12 relative to the remainder of the camera unit 10 along the optical axis, in order to provide a focussing function. The detailed construction of the carriage assembly 38 is similar to the construction of the camera apparatus described in WO-2010/089526 to which reference is made and that is incorporated herein by reference, but for brevity the detailed construction is not described herein as it does not affect the OIS function. Indeed, the carriage assembly 38 could be adapted so that the lens system 12 is fixed.

The FPC substrate 40 includes two sensor tabs 48 extending from one of the carriage mounts 46, that are deformed over the edge of the of the carriage plate 50 to extend down to the lower surface of the carriage plate 50 to abut the PCB 14. The FPC substrate 40 also includes a gyroscope tab 49 extending from the same one of the carriage mounts 46 as the sensor tabs 48, that is deformed upwardly, outside and spaced from the edge of the of the chassis 20. A gyroscope sensor 70 is fixed to the gyroscope tab 49.

The flexures 45 are resilient and arranged as beams having a greater width as viewed along the optical axis O than thickness as viewed perpendicular to the optical axis O, thereby providing a greater degree of resistance to movement laterally to the optical axis than to movement along the optical axis O. This configuration allows deflection along the optical axis O while resisting movement perpendicular to the optical axis O. Thus, the flexures 45 assist in supporting the camera unit 10 and guiding its movement by allowing tilting of the camera unit 10 around the pivot axes upon deflection of the flexures 45, driven by the SMA actuator system 30. Arranging the flexures 45 to be substantially co-planar is found to be desirable in achieving this. Such a co-planar arrangement is achieved because the flexures 45 are formed from the same sheet of material, that is the FPC substrate 40.

The flexure arrangement 45 is therefore designed to allow the camera unit 10 to tilt under the drive provided by the SMA actuator system 30. Typically, the camera unit 10 is allowed to tilt by at least ±0.5°, preferably at least ±1.0°, more preferably at least ±1.5°. The flexure arrangement 45 may also be designed to control the resonant frequency of the camera unit 10. Typically, the desired resonant frequency is at least 50 Hz, preferably at least 100 Hz, more preferably at least 150 Hz. These mechanical properties of the flexure arrangement 45 may be controlled by the following: the amount of conductor on the flexures 45; the position of the conductive tracks on the flexures 45; the thickness of the FPC substrate 40, in particular at the flexures 45; the width of flexures 45; the length of the flexures 45; the orientation of the flexures 45; and the material(s) of the FPC substrate 40.

The use of flexures 45 as compared to other types of suspension system provides advantages, in particular being compact and straightforward to manufacture whilst providing a low stiffness along the optical axis O and a high stiffness in perpendicular directions. Similarly, the flexures 45 experience a minimal degree of friction against movement as compared to other suspension systems, for example a bearing.

As a result of the positioning of the pivot elements 57 and 61 relative to the flexure mounts 63 and 64, the flexure arrangement 41 is connected to the camera unit 10 at a position in the common plane in which the pivot axes of the SMA actuator subsystems 36 and 37 lie. This is advantageous because in that common plane there is no lateral movement of the camera unit 10 on tilting around the pivot axis. In contrast, portions of the camera unit 10 separated from the common plane do move laterally on tilting around a pivot axis. As a result, the flexure arrangement 41 does not need to accommodate or resist such lateral movement due to tilting. This simplifies the design of the flexures 45 of the flexure arrangement 41 because it is only necessary to resist lateral movements resulting from external forces, such as vibration of the support structure 2 or impacts.

Although the lengths of SMA wire formed by the two portions of the SMA wires 31 to 34 are ideally connected at the pivot elements 57 or 67 to the support structure at a common point, practical considerations may mean there is a small degree of separation between the connection points, for example due to the design of the pivot elements 57 or 67. Thus, in the context of this document, by connection at a common point is meant that they are connected sufficiently close to provide the desired pivoting of the camera unit 10 relative to the support structure. Similarly, although the pivot axes and the position at which the flexure arrangement 41 is connected to the camera unit 10 are ideally co-planar, practical considerations may mean that this ideal situation cannot be achieved exactly. Thus, in the context of this document, by co-planar is meant that they are sufficiently close to provide the advantages described above.

In addition, conductive tracks 42 supported on the FPC substrate 40 extend (as best seen in FIG. 7, being omitted from FIGS. 8 and 9 for clarity) from the IC chip 43 on the body 44 along one of the flexure elements 45 to the carriage plate 50 where electrical connection is made to the camera unit 10. Several such electrical connections are made.

Firstly, an electrical connection is made to the image sensor 11 by means of the conductive tracks 42 extending across the sensor tabs 48 to be connected to the PCB 14 for making an electrical connection to the image sensor 11. Via this electrical connection, signals are provided to power the image sensor 11, exchange information and transmit the image data.

Secondly, an electrical connection is made to the gyroscope sensor 70 by means of the conductive tracks 42 extending across the gyroscope tab 49. Via this electrical connection, output signals from the gyroscope sensor 70 are transferred to the IC chip 43.

Thirdly, an electrical connection is made to the SMA wires 32 and 34 of the second SMA actuator subsystem 37 by means of the crimping members 35 thereof having a tab extending to, and electrically connected to, the PCB 14. Thus, the electrical connection from the conductive tracks 42 to the PCB 14 also provides connection to the SMA wires 32 and 34. On the support structure 2, an electrical connection is made to the SMA wires 31 and 33 of the first SMA actuator subsystem 36 by means of the crimping members 35 thereof having a tab extending to, and electrically connected to, conductive tracks 42 on the body 44 of the FPC substrate 40. The crimping members 35 may be electrically connected to the PCB 14 and the FPC substrate 40 by being soldered to appropriate pads. Via these electrical connections, drive signals are supplied to the SMA wires 31 to 34.

Thus, the FPC substrate 40 is used in common to make electrical connections to the camera unit 10 and to provide the flexure arrangement 41. This simplifies the overall camera apparatus 1 in that it is not necessary to separately provide a component providing a flexure arrangement and a connector providing the electrical connection. Any such connector might introduce stiffness that adversely affects the movement of the camera unit 10 and whilst that could be minimised by appropriate designing the connector to be flexible, this introduces difficulties because it will be impossible to make the flexible connector entirely compliant. Such difficulties are avoided by using the FPC substrate 40 both as the flexure arrangement 41 and to carry electrical connections to the camera unit 10. Indeed instead of needing to minimise the mechanical impact of the electrical connector, the FPC substrate 40 provides a desired mechanism.

In addition, the arrangement of the FPC substrate 40 means that the conductive tracks 42 are all located on one side of the camera apparatus 1, which helps to route connections.

The configuration of the flexure arrangement 41 may be achieved by forming the FPC substrate 40 from a suitable material and shaping the flexures 45 appropriately. It has been appreciated that typical materials used for a flexible printed circuit, for example polyamide, as opposed a normal rigid printed circuit, are particularly suitable.

Figure 11:
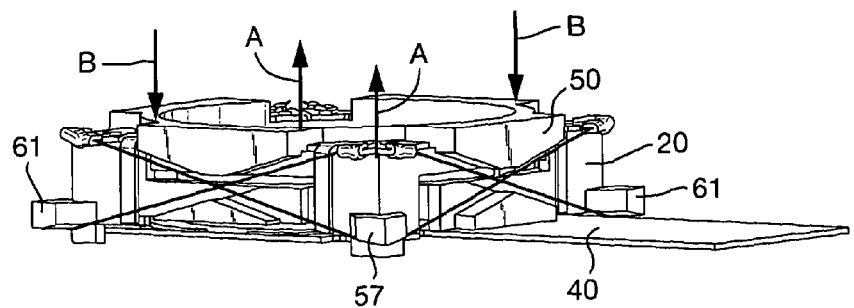
FIG. 11 is a perspective view of the chassis and the carriage plate of a modified form of the camera apparatus.

In a modified form of the camera apparatus 1, the SMA actuator system 30 may be arranged differently as shown in FIG. 11. In this case, the SMA wires 31 to 34 are configured not to extend along one side of the camera apparatus 1 with the pivot elements 57 and 61 arranged on the midpoint of each side. Instead, the carriage plate 50 and chassis 20 are modified to provide the pivot elements 57 and 61 in the corners of the camera apparatus 1, so that each SMA wire 31 to 34 extends around the corner with the two portions extending from the pivot elements 57 and 61 extending along a side of the camera apparatus 1. Thus, the two portions of each SMA wire 31 to 34 extending from the pivot elements 57 and 61 each extend at an angle of less than 90° to a common notional line radial of the optical axis O, as viewed along the optical axis O, i.e. diagonally to the square shape of the camera apparatus 1. This provides the advantage of increasing the effective length of the SMA wires 31 to 34 available within the constraints of a particular square footprint, albeit at the expense of complicating the arrangement slightly. However, the operation is identical with the modification that the pivot axes provided by the pivot elements 57 and 61 are diagonal to the square shape of the camera apparatus 1.

Figure 12:
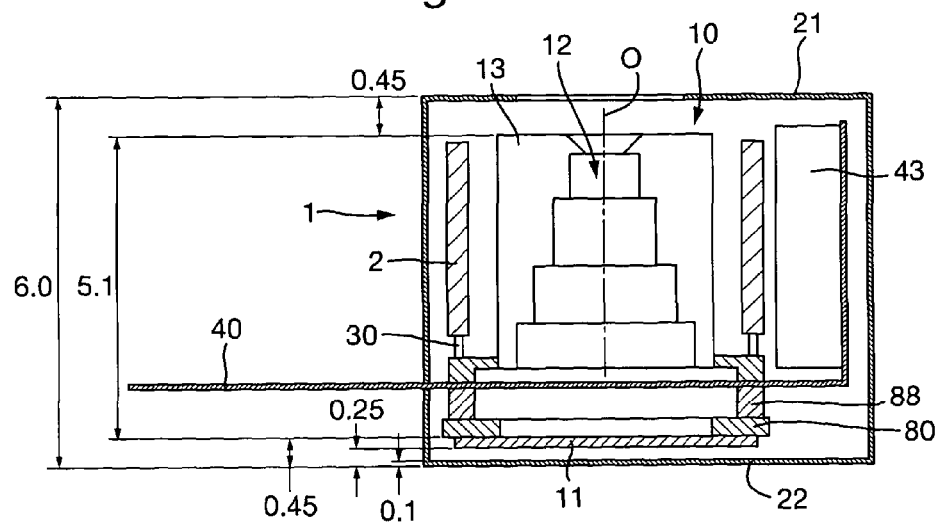
FIG. 12 is a schematic cross-sectional view of a camera apparatus in a further modified form.

There will now be described a modified form of the camera apparatus 1 that is shown in FIG. 12 which is a cross-sectional view, the cross-section being taken along the optical axis O and the camera apparatus 1 being shown schematically in order to illustrate the functional relationship between the components. The modified camera apparatus includes modifications relating to the electrical connection of the image sensor 11 to the FPC substrate 40. The modified camera apparatus 1 has the same construction as described above, except for the modifications described below, and so common elements are given common reference numerals and for brevity a description thereof is not repeated.

In the modified camera apparatus 1, instead of the image sensor 11 being mounted on a PCB 14 positioned on the rear side of the image sensor 11, the image sensor 11 is mounted and connected to the FPC substrate 40 using an intermediate substrate 80 arranged in front of the image sensor 11. The modified camera apparatus 1 may have a construction similar to that shown in FIGS. 3 to 10, in which the pivot elements 57 and 61 are arranged on the midpoint of each side thereof, or may have the modified construction shown in FIG. 11, in which the pivot elements 57 and 61 are arranged in the corners of the camera apparatus 1. The detailed construction of the modified camera apparatus 1 will now be described in the latter case of having a construction similar to that shown in FIGS. 3 to 10.

Figure 13:
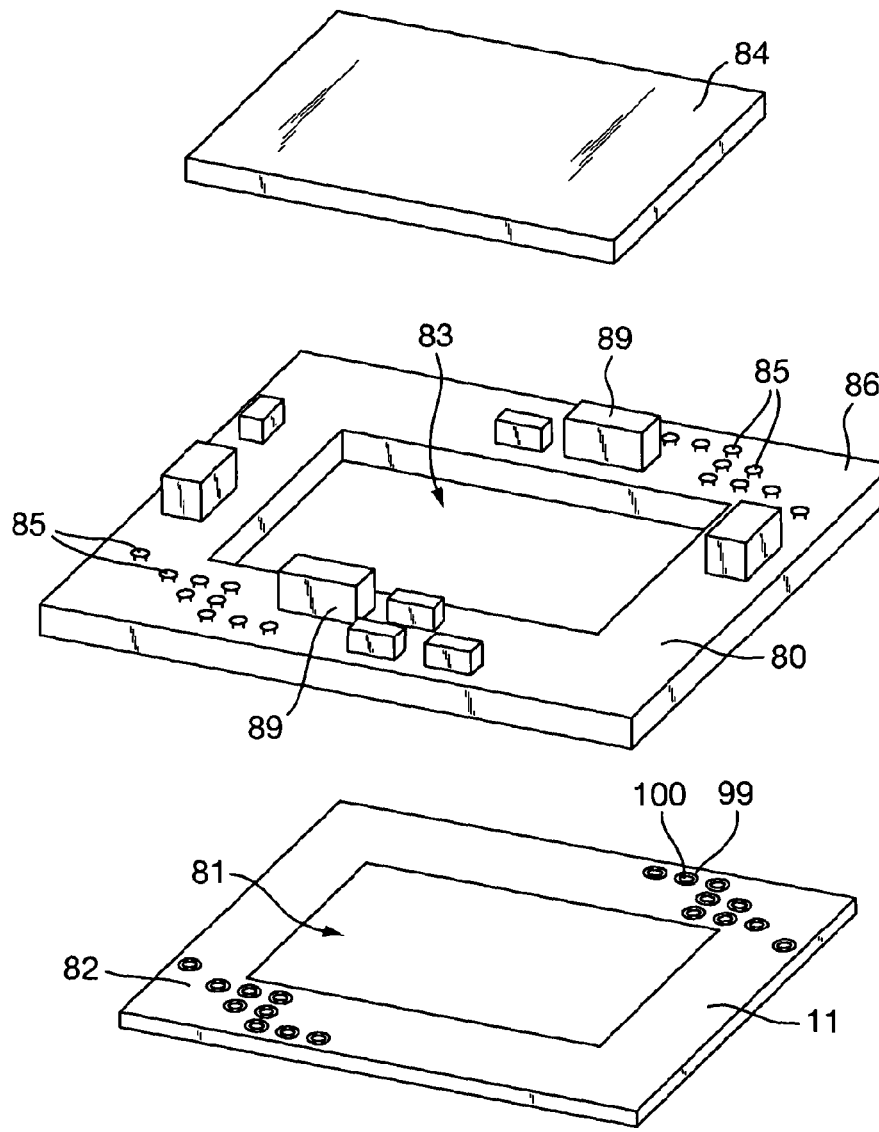
FIG. 13 is a perspective, exploded view of an assembly of an image sensor and an intermediate connecting element.

FIGS. 13 to 15 illustrate the intermediate substrate 80 and its mounting to the image sensor 11. The image sensor 11 has a photosensitive area 81 and a peripheral area 82 extending therearound. The image sensor 11 has a plurality of terminals 99 arranged on its front side within the peripheral area 82. The terminals 99 have the purpose of providing electrical connection of the image sensor 11 to the IC chip 43.

To allow focussing of an image on the photosensitive area 81, the intermediate substrate 80 has an opening 83 that is larger than the photosensitive area 81 and aligned therewith. The intermediate substrate 80 is fixed to the image sensor 11 on the peripheral area 82. The intermediate substrate 80 is in this example ring-shaped with the opening 83 being a central aperture, but this is not essential and instead the intermediate substrate 80 could extend only part way around the photosensitive area 81.

The intermediate substrate 80 also has an optically transparent protective sheet 84 mounted across the opening 83. The protective sheet 84 is optional, but can provide physical protection of the photosensitive area 81, for example from dust, and/or be an optical filter, for example an infra-red filter. The protective sheet 84 is fixed to the substrate 81 by any suitable means, for example adhesive.

The intermediate substrate 80 incorporates a plurality of conductive tracks 85 that extend between the opposite faces 86 and 87 of the intermediate substrate 80. The intermediate substrate 80 is a substrate consisting of ceramic material, although it could alternatively be formed of other suitable non-conductive materials. Desirably, the intermediate substrate 80 has similar thermal expansion properties to the image sensor 11. Thus, the intermediate substrate 80 may have a construction and manufacture similar to known ceramic substrates used to connect silicon devices to PCBs to provide closer thermal matching with the silicon devices.

The conductive tracks 85 are electrically connected on the first one of the faces 87 of the intermediate substrate 80 to the terminals 99 on the front side of the image sensor 11 by solder bumps 100. This connection may be made using conventional flip-chip techniques. As well as providing electrical connection, the solder bumps 100 physically mount the intermediate substrate 80 to the image sensor 11.

The intermediate substrate 80 acts as an intermediate component providing electrical connection between the image sensor 11 and the FPC substrate 40 as follows.

Figure 17:
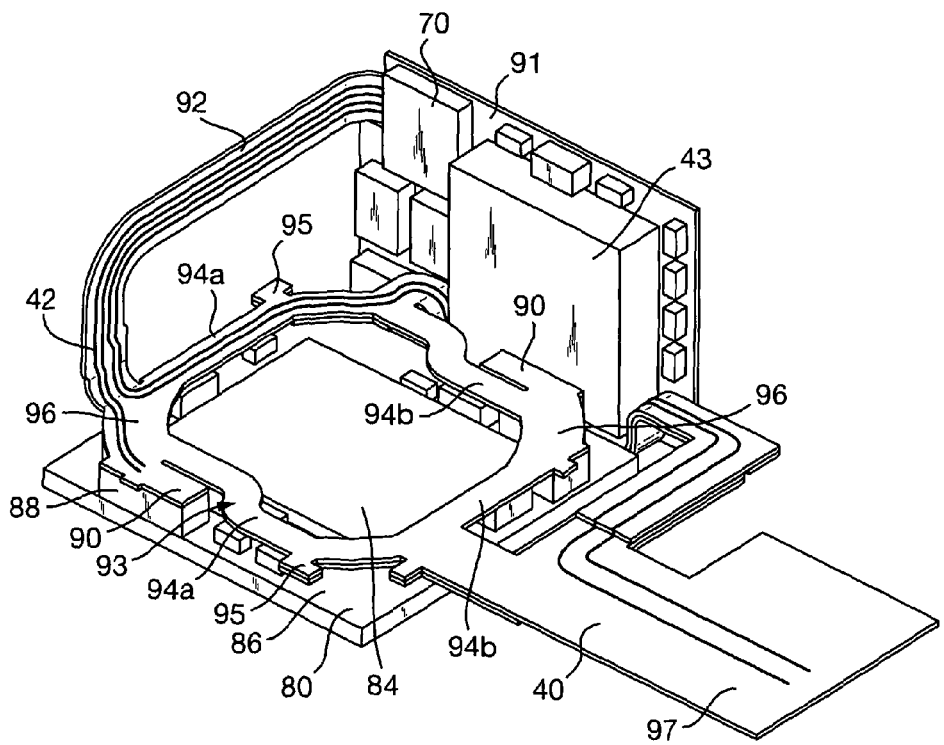
FIG. 17 is a perspective view of the assembly of FIG. 13 assembled with the flexible printed circuit assembly.

The intermediate substrate 80 is connected to the FPC substrate 40 as shown in FIGS. 16 and 17. The conductive tracks 85 of the intermediate substrate 80 are electrically connected on the second face 86 of the intermediate substrate 80 to the tracks 42 on a tab 90 of the FPC substrate 40 through PCBs 88 that act as further connector elements disposed physically between the FPC substrate 40 and the intermediate substrate 80. The PCBs 88 space the FPC substrate 40 from the intermediate substrate 80 to provide clearance for the protective sheet 84 and for a number of passive electrical components 89 that are mounted on the front side of the intermediate substrate 80 outside the protective sheet 84.

Figure 18:
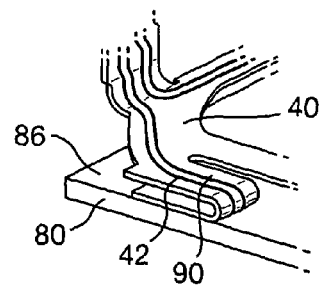
FIG. 18 is a perspective view of an alternative connection arrangement between the assembly of FIG. 13 and the flexible printed circuit assembly.

As an alternative to the immediate substrate 80 being connected to the FPC substrate 40 through the PCBs 88 as further connector elements, the intermediate substrate 80 may alternatively be connected directly to the FPC substrate 40 in the manner shown in FIG. 18. In this alternative, the tab 90 of the FPC substrate 40 is extended in length and bent over to contact the intermediate substrate 80. The tab 90 carries the conductive tracks 42 that are connected directly to the conductive tracks 85 of the intermediate substrate 80 on the second face 86 thereof.

The FPC substrate 40 is mechanically connected between the camera unit 10 and the support structure 2 with the portion therebetween being configured as a flexure arrangement 93 that provides a greater resistance to movement laterally of the optical axis and to resistance along the optical axis. This flexure arrangement 93 is provided by the FPC substrate being formed from a sheet of non-conductive material that is shaped to provide the following arrangement.

The FPC substrate 40 includes a body 91 on which the IC chip 43 and the gyroscope sensor 70 are mounted. The body 91 is provided on the end of a leg 92 that is connected to a portion of the FPC substrate 40 configured as the flexure arrangement 93 that, on assembly into the camera apparatus 1, is connected between the carriage plate 50 and the chassis 20.

The flexure arrangement 93 consists of four flexures 94 arranged in a loop, with two chassis mounts 95 and two carriage mounts 96 arranged intermediate the four flexures 94. One of the carriage mounts 96 is connected to the leg 92. Two flexures 94a extend from that carriage mount 96 to respective chassis mounts 95. Two further flexures extend from a respective one of the chassis mounts 95 to the second one of the carriage mounts 96. The two carriage mounts 96 are positioned in the FPC substrate 40 adjacent the tabs 90 by which the FPC substrate 40 is connected to the intermediate substrate 80 via the PCBs 88.

Figure 19:
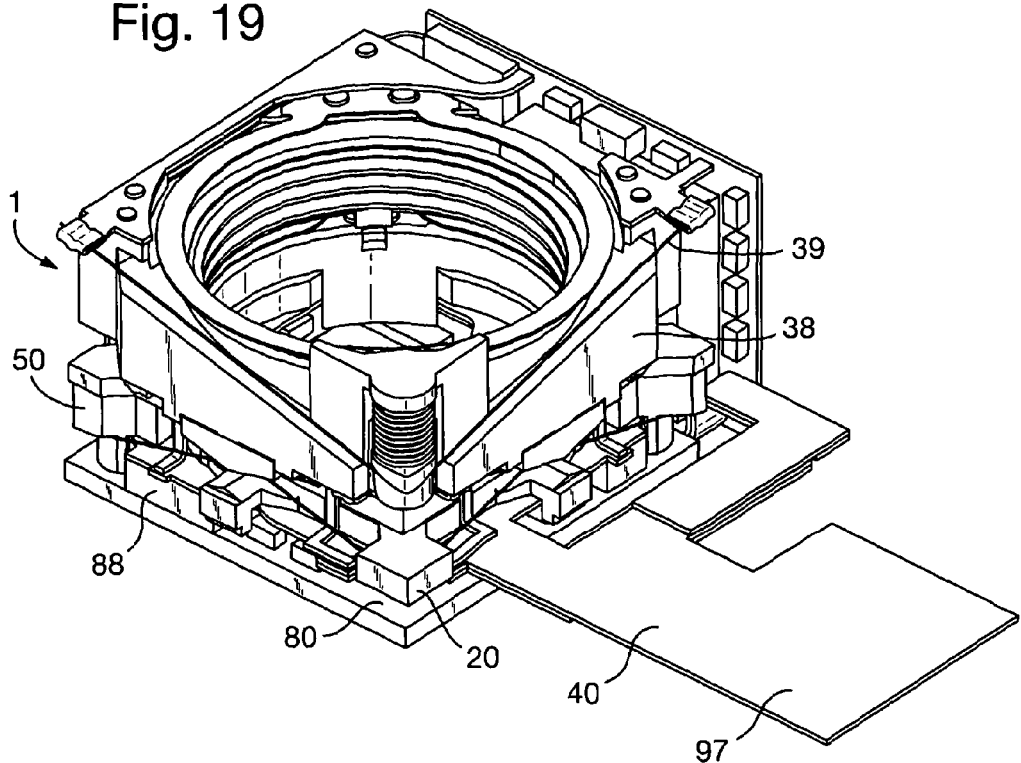
FIG. 19 is a perspective view of the assembled camera apparatus.

The chassis mounts 95 and the carriage mounts 96 are used to connect the flexures 94 to the carriage plate 50 and the chassis 20 as shown in FIG. 19. The carriage plate 50 and chassis 20 are assembled together and the SMA wires 31 to 34 are attached thereto. Then, the assembly of the chassis 20 and the carriage plate 50 is positioned over the FPC substrate, where the chassis mounts 95 are fixed to the chassis 20 and the carriage mounts 96 are fixed to the carriage plate 50.

The image sensor 11 is also mounted to the carriage plates 96 by virtue of the physical connection to the tabs 90 through the intermediate substrate 80 and the PCBs 88. In this manner the image sensor 11 and the carriage plate 50 are connected together as part of the camera unit 10 that is moved relative to the chassis 20.

A carriage assembly 38 that forms part of the carriage 13 with the carriage plate 50 is attached to the carriage plate 50, in particular to the assembly mounts 55. As described above, the carriage assembly 38 incorporates an additional SMA wire 39 that is arranged to drive movement of the lens system 12 relative to the remainder of the camera unit 10 along the optical axis O, in order to provide a focussing function, although the carriage assembly 38 could be adapted so that the lens system 12 is fixed.

In this further modified camera apparatus 1, the FPC substrate 40 is arranged in front of the intermediate substrate 80 inside the height of the lens system 12 along the optical axis O. By way of illustration, typical dimensions in the direction along the optical axis I are shown in FIG. 12. The flexure arrangement 93 is connected to the camera unit 10 at a position in the common plane in which the pivot axes of the SMA actuator subsystems 36 and 37 lie. This provides the same advantages as described above for the flexure arrangement 41.

Compared to the camera apparatus 1 described above, for example as shown in FIG. 1, the modified camera apparatus 1 differs in that there is no PCB 14 positioned behind the image sensor 11, this being achieved through the use of the intermediate substrate 80. This has the benefit that the overall height of the camera apparatus 1 is reduced compared to the arrangement described above, as shown for example in FIG. 1. Thus the bottom can 22 may be positioned closer to the image sensor 11. By way of comparison in the camera apparatus 1 described above the thickness of the FPC 14 might typically be of the order of 0.4 mm which would add the same height to the overall height of the camera apparatus 1. This reduction in the height is a significant advantage, particularly in the context of a camera apparatus 1 that is designed to the integrated into a portable electronic device.

Figure 20:
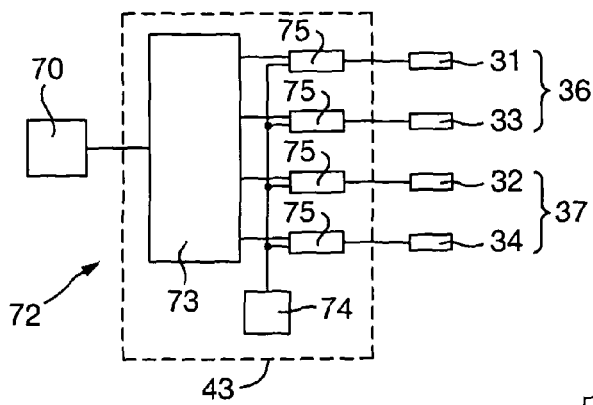
FIG. 20 is a diagram of a control circuit for generating drive signals for the SMA wires.

There will now be described a control circuit 72 that generates the drive signals that are supplied to the SMA wires 31 to 34. The control circuit 72 is shown in FIG. 20 and includes an SMA tilt controller 73, a stress controller 74 and drive circuits 75 all implemented in the IC chip 43, although they could alternatively be implemented in plural IC chips.

The control circuit 72 includes the gyroscope sensor 70 that outputs a signal representative of the angular velocity of the camera unit 10, thereby acting as a vibration sensor that detects the vibrations that the camera unit 10 is experiencing. The gyroscope sensor 70 is typically a pair of miniature gyroscopes, for detecting vibration around two axes perpendicular to each other and the optical axis, although in general larger numbers of gyroscopes or other types of vibration sensor could be used.

The SMA tilt controller 73 is supplied with the output signals of the gyroscope sensor 70 and in response thereto generates a tilt control signal in respect of each SMA wire 31 to 34. The SMA tilt controller 73 may be implemented in a processor and generates the tilt control signals in accordance with a control algorithm. The tilt control signals are representative of the degree of actuation required from the respective SMA wires 31 to 34 to compensate for the vibration represented by the output signal of gyroscope sensor 70. Thus the tilt control signals include a differential component for the SMA wires 31 and 33 of the first SMA actuator subsystem 36, and a differential component for the SMA wires 32 and 34 of the second SMA actuator subsystem 37, to provide a differential displacement providing the required degree of tilt around the corresponding pivot axis perpendicular to the optical axis O. Effectively this means that the differential component (difference between the tilt control signals) is representative of the demanded angle of tilt around that axis. These differential components may be modified by compensation algorithms to compensate for non-linear effects such as hysteresis in the SMA material.

Ideally, the gyroscope sensor 70 is aligned to provide two output signals representative of the tilt around perpendicular axes aligned with the axes around which each of the SMA actuator subsystems 36 and 37 is capable of tilting the camera unit 10. In this case, the tilt control signals for each of the SMA actuator subsystems 36 and 37 are derived from a single one of the output signals. However, in the case of misalignment, or a gyroscope sensor 70 that provides more output signals, the tilt control signals for each SMA actuator subsystem 36 and 37 is derived from a linear combination of the output signals.

As the gyroscope sensor 70 is fixed to the camera unit 10, the output signals are representative of the vibration of the camera unit 10. Therefore, OIS is effected by tilting the camera unit 10 in a manner tending to reduce these vibrations. Accordingly, the SMA tilt controller 73 generates tilt control signals providing a demanded angle of tilt reduces the actual tilt as measured by the gyroscope sensor 70. However, as an alternative, the gyroscope sensor 70 could be mounted on the support structure 2. In that case, the output signals are representative of the vibration of the support structure 2. Such vibration will always be present and OIS is effected by tilting the camera unit 10 in opposition. Accordingly, the SMA tilt controller 73 generates control signals providing a demanded angle of tilt which is opposite to the actual tilt as measured by the gyroscope sensor 70.

The stress controller 74 generates a stress control signal that is supplied in common to each SMA wire 31 to 34. The stress control signal represents the desired stress in SMA wires 31 to 34 and may be varied in response to the ambient temperature, that itself may be determined by a temperature sensor (not shown) or from measured electrical parameters of the SMA wires 31 to 34. Varying the level of the stress in the SMA wires 31 to 34 provides active control of their stress cycle. The camera apparatus 1 is configured to develop a relatively high stress in the SMA wires 31 to 34, whilst minimising the stress range. A high stress raises the temperature at which the stress in the SMA material is sufficient to cause contraction. The stress control signal may therefore be varied in response to the ambient temperature, being increased with increasing ambient temperature. Conversely, keeping the stress range small over a large change in strain has the advantage of minimising fatigue effects. Minimising the stress range also has the effect of minimising the drive power required to change the phase of the SMA wires 31 to 34 and allow them to contract.

Figure 21:
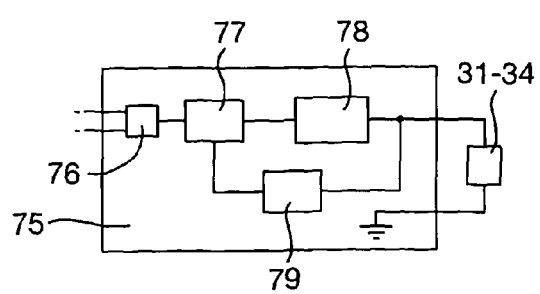
FIG. 21 is a diagram of the drive circuit of the control circuit.

Each SMA wire 31 to 34 has a respective drive circuit 75 that is supplied with the common stress control signal and the respective tilt control signal, and generates a drive signal in accordance therewith. The drive signals are supplied from the drive circuit 75 to the respective SMA wires 31 to 34. The drive circuits 75 have identical arrangement as shown in FIG. 21.

The drive circuit 75 includes a combination circuit 76 that combines the received stress control signal and tilt control signal to generate an overall drive signal representative of a target resistance for the SMA wire 31 to 34 controlled by the respective drive circuit 75. In the simplest case, this may be done simply by summing the received stress control signal and tilt control signal, with appropriate scaling. For greater accuracy, the overall control signal may be modified by a compensation algorithm to compensate for non-linear effects. That being said, optionally the stress controller 74 and the combination circuit 76 may be omitted, in which case the tilt control signal implicitly sets the stress in the SMA wire 31 to 34.

The drive circuit 75 also includes a drive controller 77 that is supplied with the overall control signal from the combination circuit 76 and controls a driver 78 using resistance feedback. The drive controller 77 may be implemented in a processor.

The driver 78 is connected to supply the drive current to the SMA wire 31 to 34. The driver 78 may be a constant-voltage current source or a constant-current current source. For example, in the latter case the constant current might be of the order of 120 mA.

The drive circuit 75 further includes a detection circuit 79 arranged to detect the resistance of the SMA wire 31 to 34. In the case that the driver 78 is a constant-current current source, the detection circuit 79 may be a voltage detection circuit operable to detect the voltage across the SMA actuator 31 which is a measure of the resistance of the piece of SMA wire 32. In the case that the driver 78 is a constant-voltage current source, the detection circuit 79 may be a current detection circuit. For a higher degree of accuracy the detection circuit 79 may comprise a voltage detection circuit and a current detection circuit operable to detect both the voltage and current across the SMA actuator and to derive a measure of resistance as the ratio thereof.

The drive controller 77 is arranged to control the driver 78 to supply a pulse-width modulated current. The drive controller 77 receives the resistance measured by the detection circuit 79 and uses it as a feedback signal in a closed-loop control algorithm to control the PWM duty cycle of the driver 78 to actuate the SMA wire 31 to 34 in accordance with the demand represented by the overall control signal. The closed-loop control may be proportional.

By using the electrical resistance of the SMA wires 31 to 34 as a feedback parameter that relates to position, over the functional movement range the contraction and expansion of the SMA material is approximately linear with its electrical resistance. Non-linearities, including hysteresis and creep, occur to some extent. These may be ignored, but for better linearity, these may be accounted for in the closed-loop control algorithm.

Although this drive circuit 75 and its algorithm is very successful in controlling the SMA actuator 31, owing to the natural variation in SMA material properties from batch to batch, and other manufacturing tolerances, such as spring stiffnesses and assembly placement tolerances, the actual change in tilt of the camera unit 10 that corresponds to a certain change in the demanded tilt will have some variance, perhaps only being accurate to approximately 10%.

This variance can be reduced in a number of ways.

In the case of the first arrangement, one convenient approach is to encapsulate the accuracy error of the SMA wires 31 to 34 and to consider it as an error in the SMA drive control gain, for example the gain between the displacement of each SMA actuator 31 and its electrical resistance. The change in position that corresponds to a specific (quasi-linear) change in resistance corresponds to the gain, and hence all the errors can be considered as an error in this gain. This gain may be calibrated for individual camera apparatuses 1 during manufacture on the basis of measurements of the displacement of the SMA wires 31 to 34.

An alternative scheme is to use a dedicated calibration routine in which the control circuit 72 demands a deliberate vibration from the SMA wires 31 to 34, and the induced vibrations are then sensed by the gyroscope sensor 70, and so the actual tilt vibrations can be assessed. Based on the output signals of the gyroscope sensor 70, the gain is adjusted until the demanded tilts match the measured tilts. This scheme assumes the base excitation vibrations can be ignored or deconvolved from the sensed vibrations.

As there are a plurality of separate SMA wires 31 to 34, each one can have a variable gain that can be separately optimised as part of the algorithm described above.

As an alternative to using resistance feedback, the control may alternatively use the technique described in British Patent Application No. 1100350.6 (J A Kemp Ref: N.111974A) to which reference is made and which is incorporated herein by reference.

In the described embodiments, the different aspects of the invention are applied together. In general the different aspects, and the optional features thereof defined in the dependent claims, may be applied together in any combination of the aspects and any combination of the optional features thereof.

The invention claimed is:

1. A camera apparatus comprising:
   a support structure;
   a camera unit comprising an image sensor and a lens system for focussing an image on the image sensor; and
   an SMA actuator system comprising two SMA actuator subsystems each comprising two pairs of lengths of SMA wire connected between the camera unit and the support structure, the lengths of SMA wire in each pair being connected at a common point to either the camera unit or the support structure, the pairs being disposed on opposite sides of the camera unit and the camera unit being arranged to pivot relative to the support structure about respective pivot axes extending through the common points in respect of the two pairs of lengths of SMA wire in each SMA actuator subsystem, the pivot axes of the two SMA actuator subsystems being perpendicular to the optical axis and to each other and lying in a common plane along the optical axis, each SMA actuator subsystem being arranged, on differential contraction of the SMA wires thereof, to drive rotation of the camera unit around the pivot axis of the other SMA actuator subsystem, the two SMA actuator subsystems being arranged, on common contraction of the SMA wires thereof, to drive displacement of the camera unit in opposite directions along the optical axis relative to the support structure,
   wherein the lengths of SMA wire in each pair of one of the SMA actuator subsystems is connected at a common point to the camera unit and the lengths of SMA wire in each pair of the other of the SMA actuator subsystems is connected at a common point to the support structure.

2. The apparatus according to claim 1, further comprising a flexure arrangement connected between the support structure and the camera unit and arranged to provide a greater degree of resistance to movement laterally to the optical axis than to movement along the optical axis.

3. The apparatus according to claim 2, wherein the flexure arrangement is connected to the camera unit at a position in the common plane in which the pivot axes of the two SMA actuator subsystems lie.

4. The apparatus according to claim 2, further comprising a non-conductive substrate supporting conductive tracks that are electrically connected to the SMA actuator system on at least one of the support structure and the movable element, the flexure arrangement being a portion of the substrate.

5. The apparatus according to claim 2, wherein the flexure arrangement comprises a plurality of flexures.

6. The apparatus according to claim 1, the lengths of SMA wire in each pair comprises portions of a respective piece of SMA wire that is, intermediate its two ends, hooked over a pivot element provided on one of the camera unit or the support structure and thereby connected to that one of the camera unit or the support structure at a common point, and is connected, at its two ends, to the other of camera unit or to the support structure.

7. The apparatus according to claim 1, wherein the two lengths of SMA wire in each pair extend from the common point at an acute angle to the optical axis, as viewed perpendicular to the optical axis.

8. The apparatus according to claim 1, wherein the two lengths of SMA wire in each pair extend from the common point at an angle of 90°, or at an angle of less than 90°, to a common notional line radial of the optical axis, as viewed along the optical axis.

9. The apparatus according to claim 1, wherein the camera unit further comprises a control circuit electrically connected to the SMA wires for supplying drive signals thereto.

10. The apparatus according to claim 9, wherein the control circuit includes a vibration sensor arranged to generate output signals representative of the vibration of the camera unit, the control circuit being arranged to generate the drive signals in response to the output signals of the vibration sensor.

11. The apparatus according to claim 10, wherein the vibration sensor is arranged to generate output signals representative of the angular velocity of the camera unit.

12. The apparatus according to claim 11, wherein the vibration sensor is a gyroscope sensor.

13. The apparatus according to claim 1, wherein the lens system includes one or more lenses having a diameter of at most 10 mm.

14. A camera apparatus comprising:
a support structure;
a camera unit comprising an image sensor and a lens system for focussing an image on the image sensor;
an SMA actuator system comprising two SMA actuator subsystems each comprising two pairs of lengths of SMA wire connected between the camera unit and the support structure, the pairs being disposed on opposite sides of the camera unit and the lengths of SMA wire in each pair being connected at a common point to either the camera unit or the support structure, the camera unit being arranged to pivot relative to the support structure about respective pivot axes extending through the common points in respect of the two pairs of lengths of SMA wire in each SMA actuator subsystem, the pivot axes of the two SMA actuator subsystems being perpendicular to the optical axis and to each other and lying in a common plane along the optical axis, each SMA actuator subsystem being arranged, on differential contraction of the SMA wires thereof, to drive rotation of the camera unit around the pivot axis of the other SMA actuator subsystem; and
a flexure arrangement connected between the support structure and the camera unit and arranged to provide a greater degree of resistance to movement laterally to the optical axis than to movement along the optical axis,
wherein the flexure arrangement is connected to the camera unit at a position in the common plane in which the pivot axes of the two SMA actuator subsystems lie.

15. The apparatus according to claim 14, wherein the flexure arrangement is formed from a planar sheet.

16. The apparatus according to claim 14, wherein
the two SMA actuator subsystems are arranged, on common contraction of the SMA wires thereof, to drive displacement of the camera unit in opposite directions along the optical axis relative to the support structure, and
the lengths of SMA wire in each pair of one of the SMA actuator subsystems is connected at a common point to the camera unit and the lengths of SMA wire in each pair of the other of the SMA actuator subsystems is connected at a common point to the support structure.

17. The apparatus according to claim 14, further comprising a non-conductive substrate supporting conductive tracks that are electrically connected to the SMA actuator system on at least one of the support structure and the movable element, the flexure arrangement being a portion of the substrate.

18. The apparatus according to claim 14, the lengths of SMA wire in each pair comprise portions of a respective piece of SMA wire that is, intermediate its two ends, hooked over a pivot element provided on one of the camera unit or the support structure and thereby connected to that one of the camera unit or the support structure at a common point, and is connected, at its two ends, to the other of camera unit or to the support structure.

19. The apparatus according to claim 14, wherein the two lengths of SMA wire in each pair extend from the common point at an acute angle to the optical axis, as viewed perpendicular to the optical axis.

20. The apparatus according to claim 14, wherein the two lengths of SMA wire in each pair extend from the common point at an angle of 90°, or at an angle of less than 90°, to a common notional line radial of the optical axis, as viewed along the optical axis.

21. The apparatus according to claim 14, wherein the camera unit further comprises a control circuit electrically connected to the SMA wires for supplying drive signals thereto.

22. The apparatus according to claim 21, wherein the control circuit includes a vibration sensor arranged to generate output signals representative of the vibration of the camera unit, the control circuit being arranged to generate the drive signals in response to the output signals of the vibration sensor.

23. The apparatus according to claim 22, wherein the vibration sensor is arranged to generate output signals representative of the angular velocity of the camera unit.

24. The apparatus according to claim 23, wherein the vibration sensor is a gyroscope sensor.

25. The apparatus according to claim 14, wherein the lens system includes one or more lenses having a diameter of at most 10 mm.

26. The apparatus according to claim 14, wherein the flexure arrangement comprises a plurality of flexures.

* * * * *